(12) United States Patent
Park et al.

(10) Patent No.: US 9,442,337 B2
(45) Date of Patent: Sep. 13, 2016

(54) LIQUID CRYSTAL DISPLAY

(71) Applicant: Samsung Display Co., Ltd., Yongin, Gyeonggi-Do (KR)

(72) Inventors: Eun-Kil Park, Cheonan-si (KR); Je Hyeong Park, Hwaseong-si (KR)

(73) Assignee: SAMSUNG DISPLAY CO., LTD. (KR)

( * ) Notice: Subject to any disclaimer, the term of this patent is extended or adjusted under 35 U.S.C. 154(b) by 17 days.

(21) Appl. No.: 14/474,495

(22) Filed: Sep. 2, 2014

(65) Prior Publication Data

US 2015/0277192 A1 Oct. 1, 2015

(30) Foreign Application Priority Data

Apr. 1, 2014 (KR) .................. 10-2014-0038837

(51) Int. Cl.
*G02F 1/1343* (2006.01)
*G02F 1/1362* (2006.01)

(52) U.S. Cl.
CPC ... *G02F 1/136286* (2013.01); *G02F 1/134336* (2013.01); *G02F 2001/134345* (2013.01); *G02F 2001/134381* (2013.01); *G02F 2001/136222* (2013.01); *G02F 2201/40* (2013.01)

(58) Field of Classification Search
CPC .............. G02F 1/133707; G02F 2001/134345; G02F 1/134354; G02F 1/134318
USPC ......................................... 349/129, 139, 144
See application file for complete search history.

(56) References Cited

U.S. PATENT DOCUMENTS

| | | | |
|---|---|---|---|
| 6,466,288 B1 | 10/2002 | Rho | |
| 7,139,057 B2 | 11/2006 | Lee | |
| 8,203,682 B2 | 6/2012 | Lee et al. | |
| 8,203,687 B2 | 6/2012 | Choi et al. | |
| 8,508,704 B2 | 8/2013 | Chan | |
| 2009/0009449 A1* | 1/2009 | Uchida | G02F 1/13624 345/87 |
| 2010/0128214 A1* | 5/2010 | Lee | G02F 1/133788 349/130 |
| 2012/0113344 A1* | 5/2012 | Kim | G02F 1/13338 349/41 |
| 2012/0169983 A1* | 7/2012 | Ko | G02F 1/134363 349/139 |
| 2012/0236245 A1* | 9/2012 | Jung | G02F 1/1343 349/144 |
| 2013/0035012 A1 | 2/2013 | Jung et al. | |
| 2013/0235310 A1 | 9/2013 | Tang | |
| 2013/0242227 A1 | 9/2013 | Zhang | |

* cited by examiner

*Primary Examiner* — Thanh-Nhan P Nguyen
(74) *Attorney, Agent, or Firm* — Cantor Colburn LLP

(57) ABSTRACT

A liquid crystal display includes a first substrate and a second substrate facing each other, a pixel electrode disposed on the first substrate and including a first subpixel electrode including a plurality of first branch electrodes and a second subpixel electrode which is separated from the first subpixel electrode, includes a plurality of second branch electrodes, and encloses the first subpixel electrode, a compensation electrode positioned between the first subpixel electrode and the second subpixel electrode, a common electrode disposed on the second substrate; and a liquid crystal layer positioned between the first substrate and the second substrate.

17 Claims, 27 Drawing Sheets

LIQUID CRYSTAL DISPLAY

This application claims priority to Korean Patent Application No. 10-2014-0038837 filed on Apr. 1, 2014, and all the benefits accruing therefrom under 35 U.S.C. §119, the entire contents of which are incorporated herein by reference.

BACKGROUND (a) Field

The invention relates to a liquid crystal display ("LCD"). More particularly, the invention relates to an LCD preventing a texture and improving an aperture ratio.

(b) Description of the Related Art

An LCD as one of flat panel display devices that is widely being used includes two display panels where field generating electrodes such as a pixel electrode and a common electrode are provided and a liquid crystal ("LC") layer is interposed therebetween.

The LCD generates an electric field in a LC layer by applying a voltage to the field generating electrodes, to determine orientations of LC molecules of the LC layer and control polarization of incident light, thereby displaying an image.

The LCD further includes thin film transistors connected to pixel electrodes, respectively, and a plurality of signals lines such as gate lines and data lines for controlling them.

Among the LCDs, a vertical alignment ("VA") mode LCD, which aligns LC molecules such that their long axes are perpendicular to the panels in the absence of an electric field, is spotlighted because of its high contrast ratio and wide reference viewing angle. Here, the reference viewing angle implies a viewing angle that is 1:10 in contrast ratio, or a critical angle of gray-to-gray luminance reversion.

In order to approximate side visibility to front visibility in the vertical alignment mode LCD, a method of causing a difference in transmittance by dividing one pixel into two sub-pixels and applying different voltages to the two sub-pixels has been suggested.

SUMMARY

When dividing one pixel into two subpixels and approximating a side visibility to a front visibility by differentiating a transmittance, a texture is generated in a separation portion of the two subpixels. Also, to prevent the generation of the texture, when decreasing a distance between two subpixels, a short failure is generated between the two subpixels.

The invention provides a liquid crystal display ("LCD") preventing generation of texture and improving an aperture ratio.

An LCD according to an exemplary embodiment of the invention includes a first substrate and a second substrate facing each other, a pixel electrode disposed on the first substrate and including a first subpixel electrode including a plurality of first branch electrodes and a second subpixel electrode which is separated from the first subpixel electrode, includes a plurality of second branch electrodes, and encloses the first subpixel electrode, a compensation electrode positioned between the first subpixel electrode and the second subpixel electrode, a common electrode disposed on the second substrate, and a liquid crystal ("LC") layer positioned between the first substrate and the second substrate.

In an exemplary embodiment, an insulating layer disposed between the compensation electrode and the pixel electrode may be further included.

In an exemplary embodiment, the pixel electrode may be disposed on the insulating layer, and the compensation electrode may be disposed under the insulating layer.

In an exemplary embodiment, the pixel electrode may be provided as a quadrangle shape in a plan view, the first subpixel electrode may be provided as a polygon shape in the plan view, and the second subpixel electrode may be provided as a quadrangle shape in the plan view in which an opening of a polygon is defined.

In an exemplary embodiment, the first subpixel electrode may be provided as a rhombus shape or a hexagon shape.

In an exemplary embodiment, the compensation electrode may be provided as the rhombus shape or a hexagon shape in which an opening is defined.

The LCD according to an exemplary embodiment of the invention may further include a gate line and a data line provided in different layers on the first substrate, and a first thin film transistor connected to the gate line, the data line, and the first subpixel electrode.

In an exemplary embodiment, the compensation electrode may be provided in the same layer as the gate line.

In an exemplary embodiment, the compensation electrode may be floated.

In an exemplary embodiment, the LCD according to an exemplary embodiment of the invention may further include a first reference voltage line provided in the same layer as the gate line, and a connection electrode connecting the first reference voltage line and the compensation electrode.

In an exemplary embodiment, the compensation electrode may be provided in the same layer as the data line.

The LCD according to an exemplary embodiment of the invention may further include a second reference voltage line provided in the same layer as the data line, and the second reference voltage line and the compensation electrode may be connected.

In an exemplary embodiment, the compensation electrode may include a first compensation sub-electrode and a second compensation sub-electrode, the first compensation electrode may be provided in the same layer as the gate line, and the second compensation electrode may be provided in the same layer as the data line.

The LCD according to an exemplary embodiment of the invention may further include a reference voltage line provided in the same layer as the data line, and the reference voltage line and the compensation electrode may be connected.

In an exemplary embodiment, the compensation electrode may include a transparent conductive material.

The LCD according to an exemplary embodiment of the invention may further include a color filter disposed on the gate line and the data line and an insulating layer disposed between the compensation electrode and the pixel electrode, where the compensation electrode may be positioned on the color filter.

The LCD according to an exemplary embodiment of the invention may further include a gate line and a data line disposed on the first substrate, a reference voltage line disposed on the first substrate and applied with a predetermined voltage, a first thin film transistor and a second thin film transistor connected to the gate line and the data line, and a third thin film transistor connected to the gate line, the second thin film transistor, and the reference voltage line, where the first subpixel electrode may be connected to the first thin film transistor, and the second subpixel electrode may be connected to the second thin film transistor.

The LCD according to an exemplary embodiment of the invention may further include a gate line, a step-down gate line, and a data line disposed on the first substrate, a reference voltage line disposed on the first substrate and applied with a predetermined voltage, a first thin film transistor and a second thin film transistor connected to the gate line and the data line, and a third thin film transistor connected to the step-down gate line, the second thin film transistor, and the reference voltage line, where the first subpixel electrode may be connected to the first thin film transistor, and the second subpixel electrode may be connected to the second thin film transistor.

The LCD according to an exemplary embodiment of the invention may further include a gate line, a first data line, and a second data line disposed on the first substrate, a first thin film transistor connected to the gate line and the first data line, and a second thin film transistor connected to the gate line and the second data line, where the first subpixel electrode may be connected to the first thin film transistor, and the second subpixel electrode may be connected to the second thin film transistor.

In an exemplary embodiment, a first voltage applied to the first subpixel electrode may be higher than a second voltage applied to the second subpixel electrode.

The above-described LCD according to an exemplary embodiment of the invention has effects as follows.

In the LCD according to an exemplary embodiment of the invention, the compensation electrode is disposed between two subpixel electrodes, thereby preventing the generation of the texture and improving the aperture ratio.

BRIEF DESCRIPTION OF THE DRAWINGS

The above and other exemplary embodiments, advantages and features of this invention will become more apparent by describing in further detail exemplary embodiments thereof with reference to the accompanying drawings, in which.

DETAILED DESCRIPTION

Figure 1:
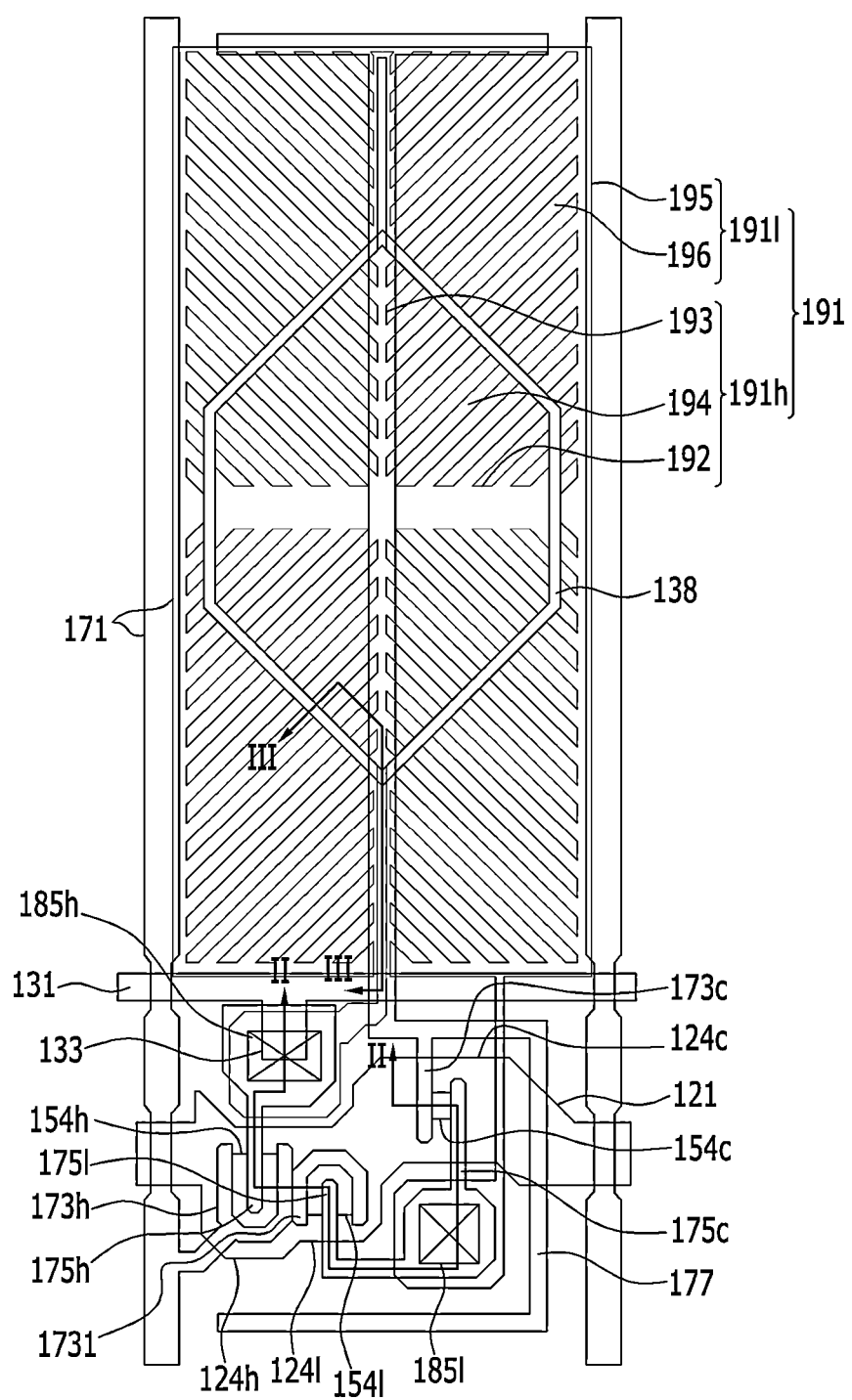
FIG. 1 is a top plan view of an exemplary embodiment of a liquid crystal display ("LCD") according to the invention.

The invention will be described more fully hereinafter with reference to the accompanying drawings, in which exemplary embodiments of the invention are shown. As those skilled in the art would realize, the described embodiments may be modified in various different ways, all without departing from the spirit or scope of the invention.

In the drawings, the thickness of layers, films, panels, regions, etc., are exaggerated for clarity. Like reference numerals designate like elements throughout the specification. It will be understood that when an element such as a layer, film, region, or substrate is referred to as being "on" or "connected to" another element, it can be directly on or connected to the other element or intervening elements may also be present. In contrast, when an element is referred to as being "directly on" or "directly connected to" another element, there are no intervening elements present. As used herein, "connected" may refer to a physical and/or electrical connection.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the invention, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims.

Firstly, a liquid crystal display ("LCD") according to an exemplary embodiment of the invention will be described with reference to FIGS. 1 to 6.

Figure 2:
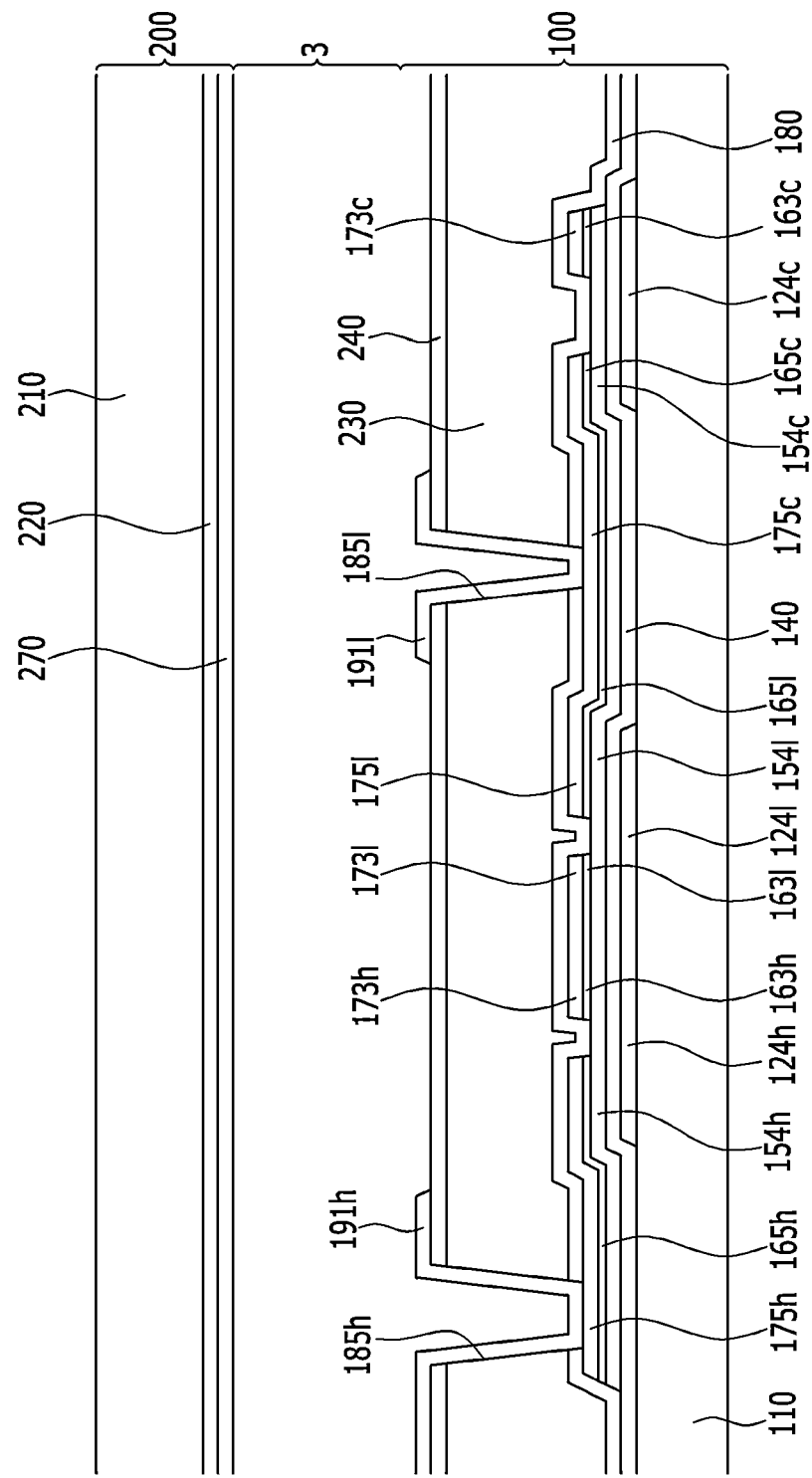
FIG. 2 is a cross-sectional view of an exemplary embodiment of the LCD according to the invention taken along line II-II of FIG. 1.
Figure 3:
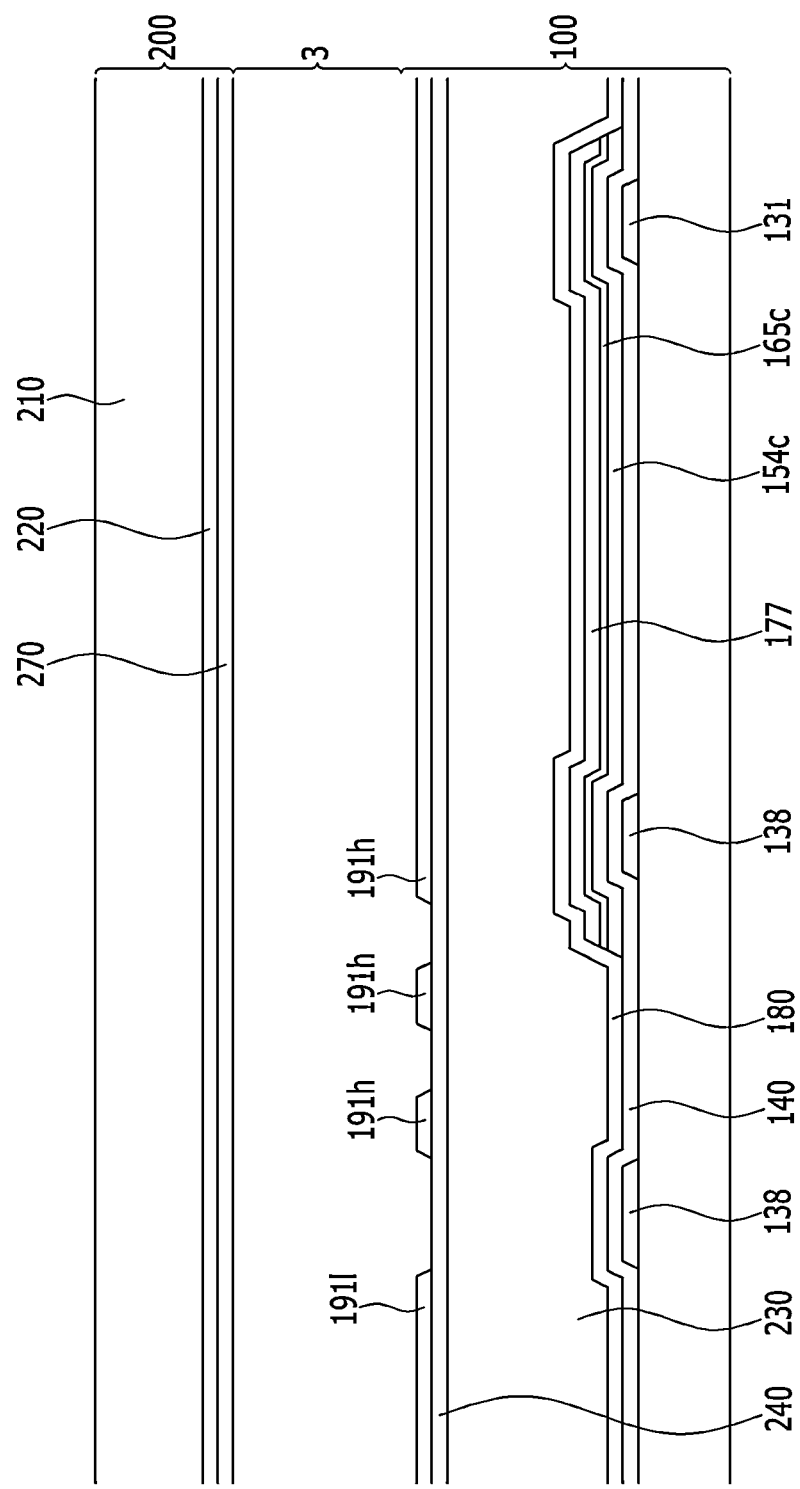
FIG. 3 is a cross-sectional view of an exemplary embodiment of the LCD according to the invention taken along line III-III of FIG. 1.
Figure 4:
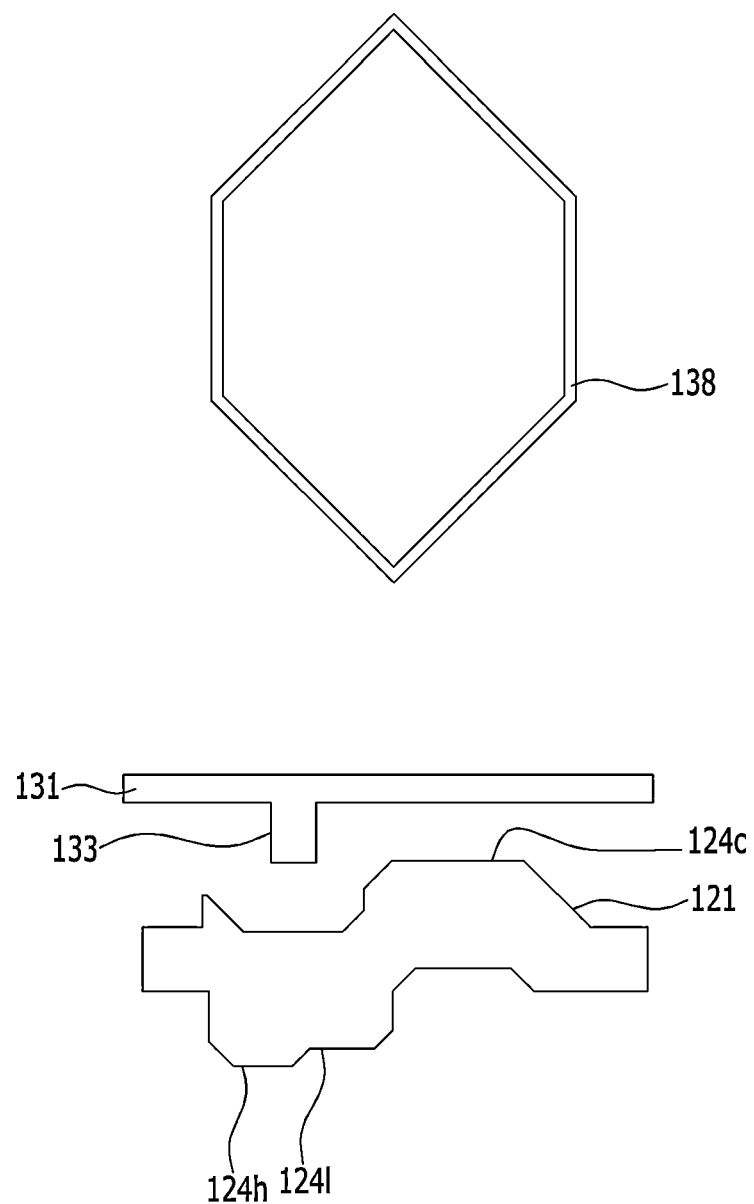
FIGS. 4 to 6 are top plan views of an exemplary embodiment of a portion of a layer of an LCD according to the invention.
Figure 5:
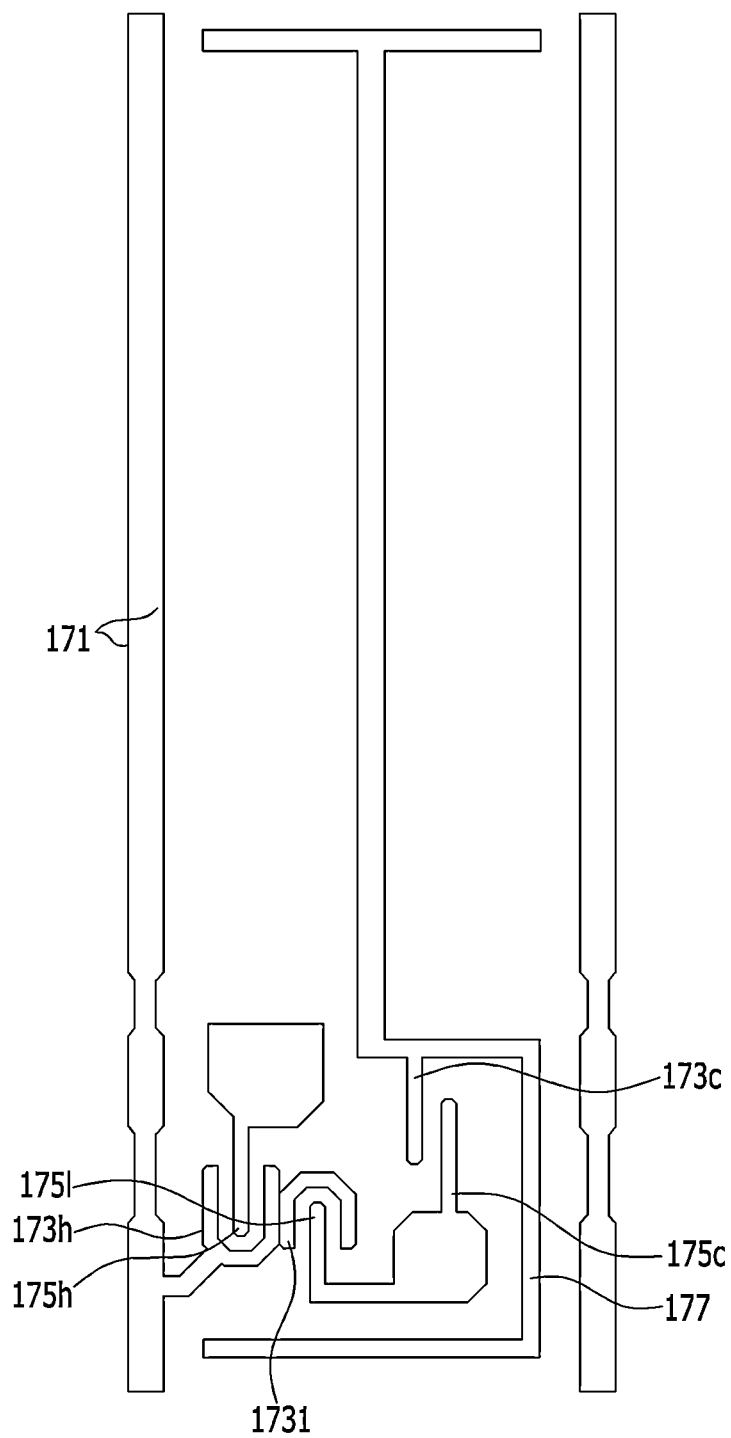
Figure 6:
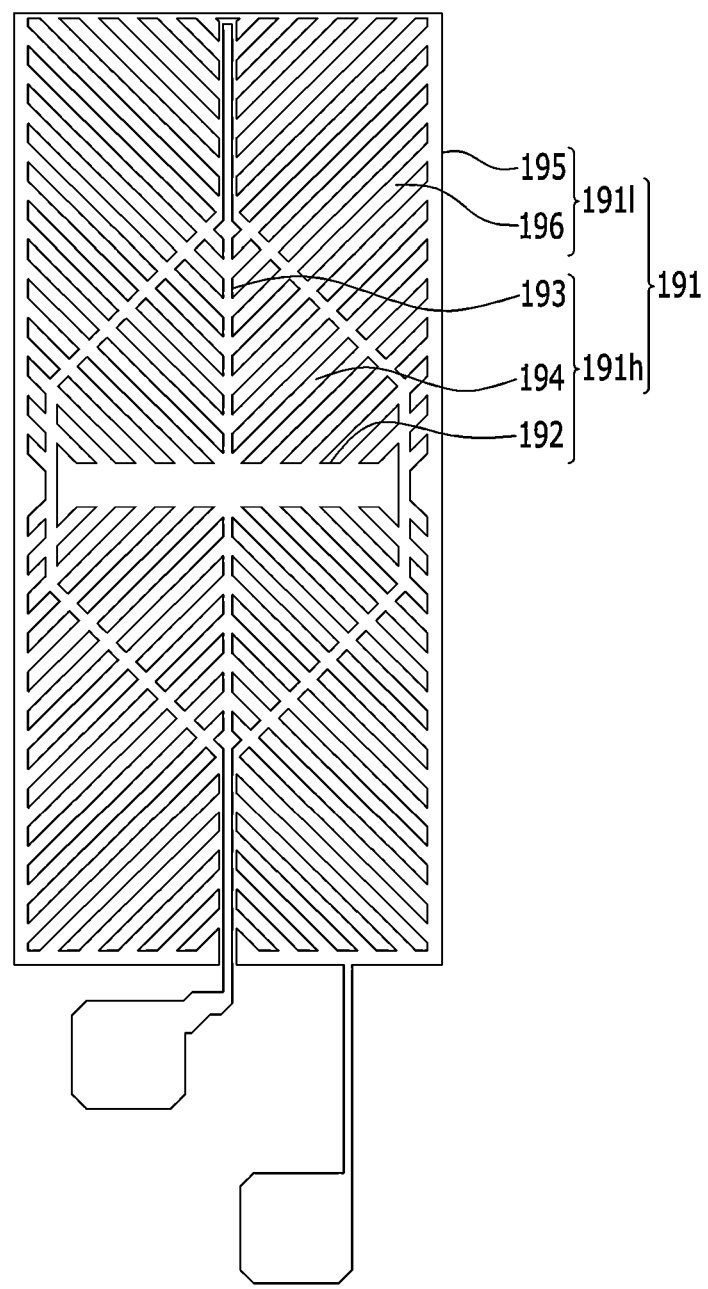

FIG. 1 is a top plan view of an LCD according to an exemplary embodiment of the invention, FIG. 2 is a cross-sectional view of the LCD according to an exemplary embodiment of the invention taken along line II-II of FIG. 1, and FIG. 3 is a cross-sectional view of the LCD according to an exemplary embodiment of the invention taken along line III-III of FIG. 1. FIGS. 4 to 6 are top plan views of a portion of a layer of an LCD according to an exemplary embodiment of the invention.

An LCD according to an exemplary embodiment of the invention includes a lower panel 100 and an upper panel 200 facing to each other, and a liquid crystal layer 3 interposed between the two display panels 100 and 200.

First, the lower panel 100 will be described.

In an exemplary embodiment, a gate line 121, a first reference voltage line 131, and a compensation electrode 138 are disposed on a first substrate 110 including transparent glass or plastic, for example.

The gate line 121, the first reference voltage line 131, and the compensation electrode 138 may be provided in the same layer, and FIG. 4 shows the gate line 121, the first reference voltage line 131, and the compensation electrode 138 provided in the same layer.

The gate line 121 extends in a substantially horizontal direction and transmits a gate signal. Also, a first gate electrode 124*h*, a second gate electrode 124*l*, and a third gate electrode 124*c* connected to the gate line 121 are provided. The first gate electrode 124*h*, the second gate electrode 124*l*, and the third gate electrode 124*c* may protrude from the gate line 121. In an exemplary embodiment, the first gate electrode 124*h* and the second gate electrode 124*l* may be integrally provided as a single unit. The first gate electrode 124*h*, the second gate electrode 124*l*, and the third gate electrode 124*c* are connected to the same gate line 121 and receive the same gate signal.

The first reference voltage line 131 may extend in a substantially direction parallel to the gate line 121, and the first reference voltage line 131 is applied with a predetermined voltage. The first reference voltage line 131 includes an expansion 133, and the expansion 133 overlaps a first drain electrode 175*h* that will be described later.

The compensation electrode 138 is separated from the gate line 121 and the first reference voltage line 131. The compensation electrode 138 is electrically floated, and the compensation electrode 138 is not separately applied with a voltage. In an exemplary embodiment, an entire plane shape of the compensation electrode 138 is a hexagon shape of which the inside thereof is empty, for example. That is, the compensation electrode 138 is linearly provided along an edge of the hexagon shape.

A gate insulating layer 140 is disposed on the gate line 121, the first to third gate electrodes 124*h*, 124*l*, and 124*c*, the first reference voltage line 131, and the compensation electrode 138. In an exemplary embodiment, the gate insulating layer 140 may include an inorganic insulating material such as a silicon nitride (SiNx) or a silicon oxide (SiOx). Also, the gate insulating layer 140 may include a single layer or a multilayer.

A first semiconductor 154*h*, a second semiconductor 154*l*, and a third semiconductor 154*c* including amorphous silicon or crystallized silicon, for example, are disposed on the gate insulating layer 140. The first semiconductor 154*h* may be positioned on the first gate electrode 124*h*, the second semiconductor 154*l* may be positioned on the second gate electrode 124*l*, and the third semiconductor 154*c* may be positioned on the third gate electrode 124*c*. The first to third semiconductors 154h, 154l, and 154c may be disposed under a data line 171 that will be described later.

A plurality of ohmic contacts 163h, 163l, 163c, 165h, 165l, and 165c are disposed on the first semiconductor 154h, the second semiconductor 154l, and the third semiconductor 154c. In an exemplary embodiment, when the semiconductors 154h, 154l, and 154c are oxide semiconductors, the ohmic contacts may be omitted.

A data line 171, a second reference voltage line 177, a first source electrode 173h, a first drain electrode 175h, a second source electrode 173l, a second drain electrode 175l, a third source electrode 173c, and a third drain electrode 175c are disposed on the ohmic contacts 163h, 163l, 163c, 165h, 165l, and 165c, and the gate insulating layer 140.

In an exemplary embodiment, the data line 171, the second reference voltage line 177, the first source electrode 173h, the first drain electrode 175h, the second source electrode 173l, the second drain electrode 175l, the third source electrode 173c, and the third drain electrode 175c may be provided in the same layer, and FIG. 5 shows the data line 171, the second reference voltage line 177, the first source electrode 173h, the first drain electrode 175h, the second source electrode 173l, the second drain electrode 175l, the third source electrode 173c, and the third drain electrode 175c provided in the same layer.

In an exemplary embodiment, the data line 171 transmits a data voltage and extends in a substantially longitudinal direction, thereby crossing the gate line 121.

The second reference voltage line 177 may extend in a direction parallel to the data line 171, and the second reference voltage line 177 is applied with a predetermined voltage. In an exemplary embodiment, the second reference voltage line 177 and the first reference voltage line 131 may be applied with the same voltage. The second reference voltage line 177 may be positioned at the center portion between two adjacent data lines 171. Also, in an exemplary embodiment, the second reference voltage line 177 may include a shape that is bent several times so as to not be short-circuited with the second drain electrode 175l and the third drain electrode 175c.

The first source electrode 173h is connected to the data line 171 and may be positioned on the first gate electrode 124h. In an exemplary embodiment, the first source electrode 173h may have a shape that is bent with a "C" shape in a plan view, for example.

The first drain electrode 175h is separated from the first source electrode 173h on the first gate electrode 124h. A channel is defined in the exposed portion of the first semiconductor 154h between the first source electrode 173h and the first drain electrode 175h separated from each other.

The second source electrode 173l is connected to the first source electrode 173h and may be positioned on the second gate electrode 124l. In an exemplary embodiment, the second source electrode 173l may have the shape that is bent with the "C" shape on the second gate electrode 124l in a plan view, for example.

The second drain electrode 175l is separated from the second source electrode 173l on the second gate electrode 124l. A channel is defined in the exposed portion of the second semiconductor 154l between the second source electrode 173l and the second drain electrode 175l separated from each other.

The third source electrode 173c is connected to the second reference voltage line 177 and may be positioned on the third gate electrode 124c.

The third drain electrode 175c is connected to the second drain electrode 175l and is separated from the third source electrode 173c on the third gate electrode 124c. A channel is defined in the exposed portion of the third semiconductor 154c between the third source electrode 173c and the third drain electrode 175c separated from each other.

The first gate electrode 124h, the first semiconductor 154h, the first source electrode 173h, and the first drain electrode 175h provide a first switching element. Also, the second gate electrode 124l, the second semiconductor 154l, the second source electrode 173l, and the second drain electrode 175l provide a second switching element, and the third gate electrode 124c, the third semiconductor 154c, the third source electrode 173c, and the third drain electrode 175c provide a third switching element.

A passivation layer 180 is disposed on the data line 171, the first to third source electrodes 173h, 173l, and 173c, the first to third drain electrodes 175h, 175l, and 175c, and the exposed portions of the first to third semiconductors 154h, 154l, and 154c. In an exemplary embodiment, the passivation layer 180 may include the inorganic insulating material such as a silicon nitride (SiNx) or a silicon oxide (SiOx).

A color filter 230 is positioned on the passivation layer 180. In an exemplary embodiment, the color filter 230 may express one of primary colors such as three primary colors of red, green, and blue, for example. The colors expressed by the color filter 230 are not limited to the three primary colors of red, green and blue, and the color filter 230 may express one of cyan, magenta, yellow, and white-based colors.

A light blocking member (not illustrated) may be located on an area where the color filter 230 is not located and a part of the color filter 230. The light blocking member is also referred to as a black matrix and prevents light leakage.

A capping layer 240 is disposed on the color filter 230. The capping layer 240 serves to prevent the color filter 230 from lifting and suppresses contamination of the liquid crystal layer 3 by an organic material, such as a solvent flowing from the color filter, so as to prevent defects such as an afterimage from being generated when a screen is driven.

A pixel electrode 191 including a first subpixel electrode 191h and a second subpixel electrode 191l is disposed on the capping layer 240. In an exemplary embodiment, the pixel electrode 191 may include a transparent conductive material such as indium tin oxide ("ITO") and indium zinc oxide ("IZO").

In an exemplary embodiment, the first subpixel electrode 191h and second subpixel electrode 191l may be provided in the same layer, and FIG. 6 shows the first subpixel electrode 191h and the second subpixel electrode 191l provided in the same layer.

In an exemplary embodiment, the entire plane shape of the first subpixel electrode 191h is provided with a hexagon shape, for example. In an exemplary embodiment, the entire plane shape of the second subpixel electrode 191l is provided as a quadrangle in which an opening of the hexagon shape is defined, for example. The hexagon opening is positioned at a center portion of the second subpixel electrode 191l, and the first subpixel electrode 191h is provided within the hexagon opening. That is, the second subpixel electrode 191l is positioned at edges of the pixel area to enclose the first subpixel electrode 191h.

The first subpixel electrode 191h includes a crossed-shape stem (192 and 193) including a transverse stem 192 and a longitudinal stem 193, and a plurality of first branch electrodes 194 extending from the crossed-shape stem (192 and 193). The first branch electrodes 194 extend in four different directions. In detail, the first branch electrodes 194 include a plurality of first minute branches obliquely extending from the crossed-shape stem (192 and 193) in the left-upper direction, a plurality of second minute branches obliquely extending in the right-upper direction, a plurality of third minute branches obliquely extending in the left-lower direction, and a plurality of fourth minute branches obliquely extending in the right-lower direction.

The second subpixel electrode 191*l* includes an outer stem 195 enclosing the edge of the pixel area, and a plurality of second branch electrodes 196 extending from the outer stem 195. The second branch electrodes 196 extend in four different directions. In detail, the second branch electrodes 196 include a plurality of fifth minute branches obliquely extending in the left-upper direction from the outer stem 195, a plurality of sixth minute branches obliquely extending in the right-upper direction, a plurality of seventh minute branches obliquely extending in the left-lower direction, and a plurality of eighth minute branches obliquely extending in the right-lower direction.

An interval between an end of the first subpixel electrode 191*h* and an end of the second subpixel electrode 191*l* adjacent to each other, that is, a separation interval between the first subpixel electrode 191*h* and the second subpixel electrode 191*l*, may be about 1 micrometer (nm) to about 5 µm.

The compensation electrode 138 is positioned under the portion where the first subpixel electrode 191*h* and the second subpixel electrode 191*l* are separated. That is, the compensation electrode 138 is positioned between the first subpixel electrode 191*h* and the second subpixel electrode 191*l*. In an exemplary embodiment, the compensation electrode 138 may partially overlap the edge of the first subpixel electrode 191*h* and the second subpixel electrode 191*l*, but the invention is not limited thereto. The insulating layer such as the gate insulating layer 140, the passivation layer 180, the color filter 230, and the capping layer 240 is provided between the compensation electrode 138 and the pixel electrode 191. The pixel electrode 191 is disposed on the insulating layer and the compensation electrode 138 is disposed under the insulating layer.

A fringe field that is relatively high is provided between the first subpixel electrode 191*h* and the second subpixel electrode 191*l*, such that a texture may be generated. In an exemplary embodiment of the invention, by providing the compensation electrode 138 between the first subpixel electrode 191*h* and the second subpixel electrode 191*l*, the fringe field between the first subpixel electrode 191*h* and the second subpixel electrode 191*l* may be decreased, thereby preventing the texture generation.

A first contact hole 185*h* exposing a portion of the first drain electrode 175*h* and a second contact hole 185*l* exposing a portion of the second drain electrode 175*l* are defined in the passivation layer 180, the color filter 230, and the capping layer 240.

The first subpixel electrode 191*h* is connected to the first drain electrode 175*h* through the first contact hole 185*h*, and the second subpixel electrode 191*l* is connected to the second drain electrode 175*l* through the second contact hole 185*l*.

The first subpixel electrode 191*h* and the second subpixel electrode 191*l* respectively receive the data voltage from the first drain electrode 175*h* and the second drain electrode 175*l* through the first contact hole 185*h* and the second contact hole 185*l*.

Now, the upper panel 200 will be described.

In an exemplary embodiment, a light blocking member 220 and a common electrode 270 are disposed on a second substrate 210 including transparent glass or plastic, for example.

In the exemplary embodiment, the color filter 230 is positioned in the lower panel 100 and the light blocking member 220 is disposed in the upper panel 200, but the invention is not limited thereto. In another exemplary embodiment, the light blocking member 220 may also be positioned in the lower panel 100 along with the color filter 230. In another exemplary embodiment, both of the color filter 230 and the light blocking member 220 may be positioned in the upper panel 200. In another exemplary embodiment, the light blocking member 220 may be positioned in the lower panel 100, and the color filter 230 may be positioned in the upper panel 200.

Although not shown, in an exemplary embodiment, an alignment layer may be disposed on inner surfaces of the lower and upper panels 100 and 200 which face each other, and the alignment layer may be a vertical alignment layer, for example.

Further, although not shown, in another exemplary embodiment, two polarizers may be respectively disposed on outer surfaces of the lower and upper panels 100 and 200, and it is preferable that transmissive axes of the polarizers are perpendicular to each other, one of which is parallel to the gate line 121. In an alternative exemplary embodiment, one polarizer may be disposed on the outer surface of one of the lower and upper panels 100 and 200.

In an exemplary embodiment, the liquid crystal layer 3 has negative dielectric anisotropy, and liquid crystal molecules of the liquid crystal layer 3 are aligned such that a long axis thereof substantially provides a right angle with respect to the surfaces of the two display panels 100 and 200 in a state where there is no electric field. Accordingly, in a state where there is no electric field, incident light is blocked without passing through a crossed polarizer.

In an exemplary embodiment, at least one of the liquid crystal layer 3 and the alignment layer may include a photo-reactive material, more specifically, a reactive mesogen, for example.

Next, an operation process of the LCD according to an exemplary embodiment of the invention will be described with reference to FIG. 7 as well as FIG. 1.

Figure 7:
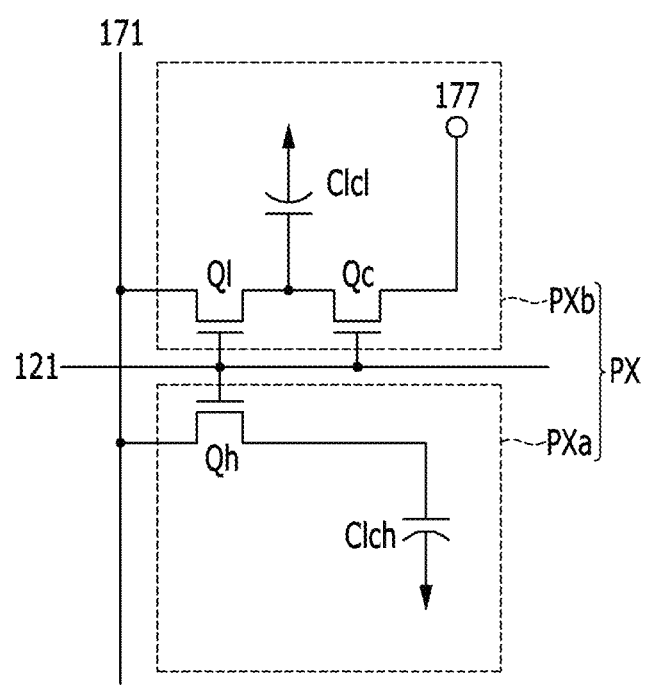
FIG. 7 is an equivalent circuit diagram of an exemplary embodiment of one pixel of an LCD according to the invention.

FIG. 7 is an equivalent circuit diagram of one pixel of an LCD according to an exemplary embodiment of the invention.

A first switching element Qh and a second switching element Ql that are connected to the same gate line 121 and the same data line 171 are provided. Further, a third switching element Qc that is connected to the second switching element Ql and the second reference voltage line 177 is further provided, and the third switching element Qc and the first and second switching elements Qh and Ql are connected to the same gate line 121. The first to third switching elements Qh, Ql, and Qc may provide a thin film transistor and the like.

Each of the pixels PX includes two subpixels PXa and PXb. A first liquid crystal capacitor Clch connected to the first switching element Qh is provided at the first subpixel PXa, and a second liquid crystal capacitor Clcl connected to the second switching element Ql is provided at the second subpixel PXb.

If the gate line 121 is applied with the gate-on voltage, the first gate electrode 124*h*, the second gate electrode 124*l*, and the third gate electrode 124*c* are applied with the gate-on voltage such that the first to third switching elements Qh, Ql, and Qc are all turned on. Accordingly, the data voltage transmitted through the data line 171 is respectively applied to the first subpixel electrode 191*h* and the second subpixel electrode 191*l* through the turned on first switching element Qh and second switching element Ql. Accordingly, the first liquid crystal capacitor Clch and the second liquid crystal capacitor Clcl are charged.

At this time, the third switching element Qc is in the turned-on state such that the data voltage transmitted to the second subpixel PXb through the data line 171 is divided through the third switching element Qc coupled in series to the second switching element Ql. In this case, the voltage is divided according to a magnitude of the channels of the second switching element Ql and the third switching element Qc. Accordingly, although the data voltage transmitted to the first subpixel PXa and the second subpixel PXb through the data line 171 is the same, the voltages charged to the first liquid crystal capacitor Clch and the second liquid crystal capacitor Clcl are differentiated. That is, in an exemplary embodiment, the voltage charged to the second liquid crystal capacitor Clcl is lower than the voltage charged to the first liquid crystal capacitor Clch. Therefore, the voltages charged to the first and second subpixels PXa and PXb in the same pixel PX are differentiated, thereby improving the lateral visibility.

In the LCD according to an exemplary embodiment of the invention, the connection relationship of each of the constituent elements may be variously changed. Next, another example of the structure differentiating the voltage charged to the first liquid crystal capacitor Clch and the second liquid crystal capacitor Clcl will be described with reference to FIGS. 8 and 9.

Figure 8:
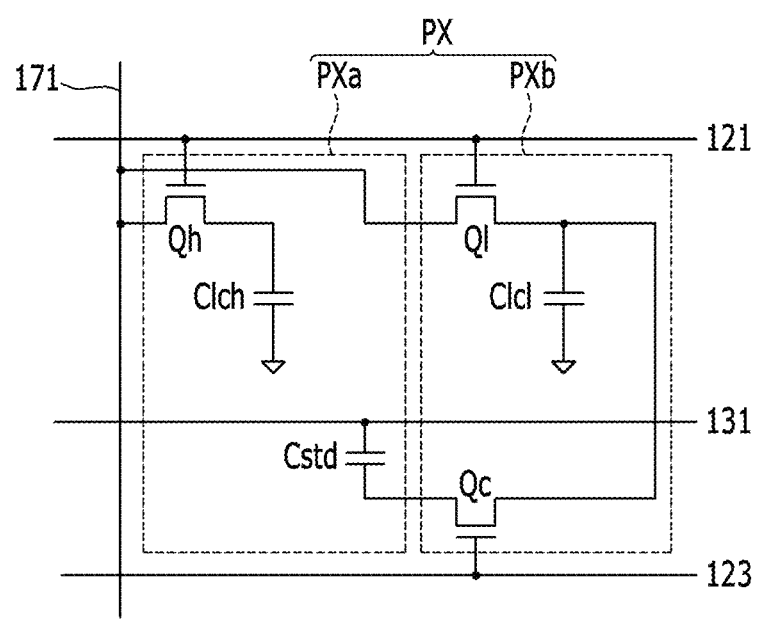
FIGS. 8 and 9 are equivalent circuit diagrams of one pixel of an LCD according to an exemplary embodiment of the invention.
Figure 9:
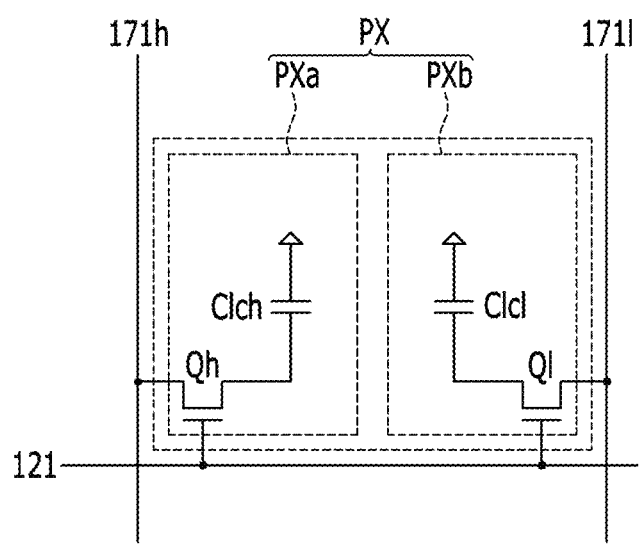

FIGS. 8 and 9 are equivalent circuit diagrams of one pixel of an LCD according to an exemplary embodiment of the invention.

The LCD according to an exemplary embodiment of the invention shown in FIG. 8 includes a plurality of signal lines 121, 123, 131, and 171 and a plurality of pixels PX connected thereto.

The signal lines 121, 123, 131, and 171 include the gate line 121 and a step-down gate line 123 transmitting the gate signal, the data line 171 transmitting the data voltage, and the first reference voltage line 131 applied with the predetermined voltage.

The first switching element Qh and the second switching element Ql that are connected to the same gate line 121 and the same data line 171 are provided. Also, the third switching element Qc connected to the step-down gate line 123 is further provided.

Each of the first and second switching elements Qh and Ql is connected to the gate line 121 and the data line 171, and the third switching element Qc is connected to the step-down gate line 123.

Each of the pixels PX includes two subpixels PXa and PXb, the first subpixel PXa includes the first liquid crystal capacitor Clch connected to the first switching element Qh, and the second subpixel PXb includes the second liquid crystal capacitor Clcl connected to the second switching element Ql.

Referring to the operation of the LCD, when the gate line 121 is applied with the gate-on voltage, the first switching element Qh and the second switching element Ql connected thereto are turned on, and the first liquid crystal capacitor Clch and the second liquid crystal capacitor Clcl are charged with the same voltage by the data voltage transmitted through the data line 171.

Next, when the gate line 121 is applied with the gate-off signal and the step-down gate line 123 is applied with the gate-on voltage, the first switching element Qh and the second switching element Ql are turned off, and the third switching element Qc is turned on. Thus, the charge is moved from the second liquid crystal capacitor Clcl to the step-down capacitor Cstd through the third switching element Qc. Thus, the charging voltage of the second liquid crystal capacitor Clcl is decreased and the step-down capacitor Cstd is charged. The charging voltage of the second liquid crystal capacitor Clcl is decreased by the capacitance of the step-down capacitor Cstd such that the charging voltage of the second liquid crystal capacitor Clcl is lower than the charging voltage of the first liquid crystal capacitor Clch. Accordingly, side visibility can be improved based on different voltages charged in the first and second subpixels PXa and PXb in the same pixel PX.

The LCD according to an exemplary embodiment of the invention shown in FIG. 9 includes a plurality of signal lines 121, 171h, and 171l and a plurality of pixels PX connected thereto.

The signal lines 121, 171h, and 171l include the gate line 121 transmitting the gate signal and a first data line 171h and a second data line 171l transmitting the different data voltages from each other.

The first switching element Qh connected to the gate line 121 and the first data line 171h is provided, and the second switching element Ql connected to the gate line 121 and the second data line 171l is provided.

Each pixel PX includes two subpixels PXa and PXb, the first subpixel PXa includes the first liquid crystal capacitor Clch connected to the first switching element Qh, and the second subpixel PXb includes the second liquid crystal capacitor Clcl connected to the second switching element Ql.

Referring to the operation of the LCD, when the gate line 121 is applied with the gate-on voltage, the first switching element Qh and the second switching element Ql connected thereto are turned on, and the first liquid crystal capacitor Clch and the second liquid crystal capacitor Clcl are charged by the different data voltages transmitted through the first and second data lines 171h and 171l, respectively. In an exemplary embodiment, the data voltage transmitted by the second data line 171l is lower than the data voltage transmitted by the first data line 171h. Accordingly, the second liquid crystal capacitor Clcl is changed with the lower voltage than that of the first liquid crystal capacitor Clch, thereby improving the lateral visibility.

As described above, at least one of the liquid crystal layer 3 and the alignment layer may include a photoreactive material, in detail, a reactive mesogen, for example. Next, a method of initially aligning liquid crystal molecule 31 to have the pretilt by using the photo-reactive material will be described with reference to FIG. 10.

Figure 10:
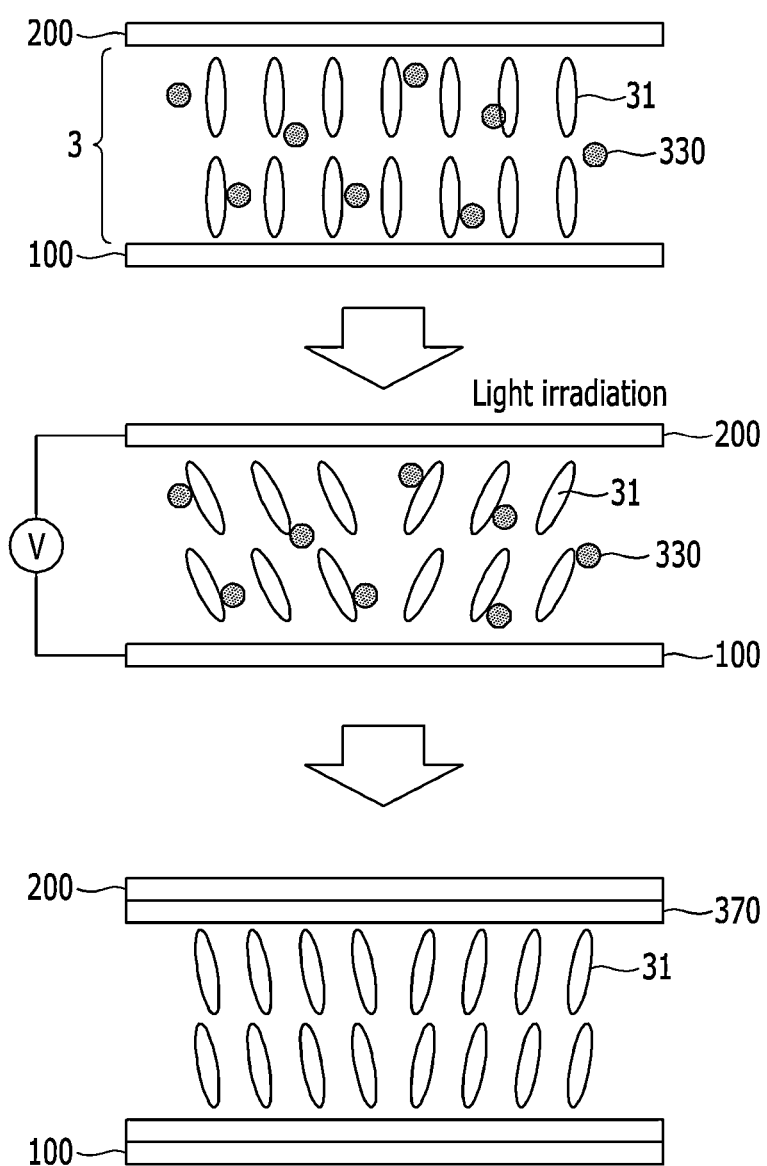
FIG. 10 is a view showing a process of providing a pretilt angle to liquid crystal ("LC") molecules by using prepolymers polarized by light such as ultraviolet rays.

FIG. 10 is a view showing a process of providing a pretilt angle to liquid crystal molecules by using prepolymers polarized by light such as ultraviolet ("UV") rays.

Firstly, prepolymers 330 such as a monomer that is polymerized by light such as UV rays are injected along with a liquid crystal material between the two display panels 100 and 200. In an exemplary embodiment, the prepolymer 330 may be a reactive mesogen that is polymerized by light such as UV rays.

Next, through several methods, the first subpixel electrode 191h and the second subpixel electrode 191l are applied with the voltages of the different magnitudes, respectively, and the common electrode 270 of the upper panel 200 is applied with the common voltage to generate the electric field to the liquid crystal layer 3 between the two display panels 100 and 200. In response to the electric field, the liquid crystal molecules 31 of the liquid crystal layer 3 are tilted in four directions as the directions approximately parallel to the extending direction of the first branch electrodes 194 of the first subpixel electrode 191*h* by the fringe field due to a plurality of first branch electrodes 194 of the first subpixel electrode 191*h* and the common electrode 270, and are tilted in four directions as the directions approximately parallel to the extending direction of the second branch electrodes 196 of the second subpixel electrode 191*l* by the fringe field due to the plurality of second branch electrodes 196 and the common electrode 270. In this case, since the first subpixel electrode 191*h* and the second subpixel electrode 191*l* are applied with the different voltages, the inclination of the liquid crystal molecule 31 corresponding to the first subpixel electrode 191*h* and the inclination angle of the liquid crystal molecule 31 corresponding to the second subpixel electrode 191*l* are differentiated with respect to the first substrate 110.

After generating the electric field to the liquid crystal layer 3, when the light such as UV rays is irradiated, the prepolymers 330 are polymerized to provide a polymer 370. The polymer 370 is provided while contacting the display panels 100 and 200. The alignment direction is determined for the liquid crystal molecules 31 to have the pretilt in the described direction by the polymer 370. Accordingly, the liquid crystal molecules 31 are arranged with the pretilts of four different directions under non-application of the voltage to the electrodes 191 and 270.

Next, the LCD according to an exemplary embodiment of the invention will be described with reference to FIGS. 11 to 13.

Figure 11:
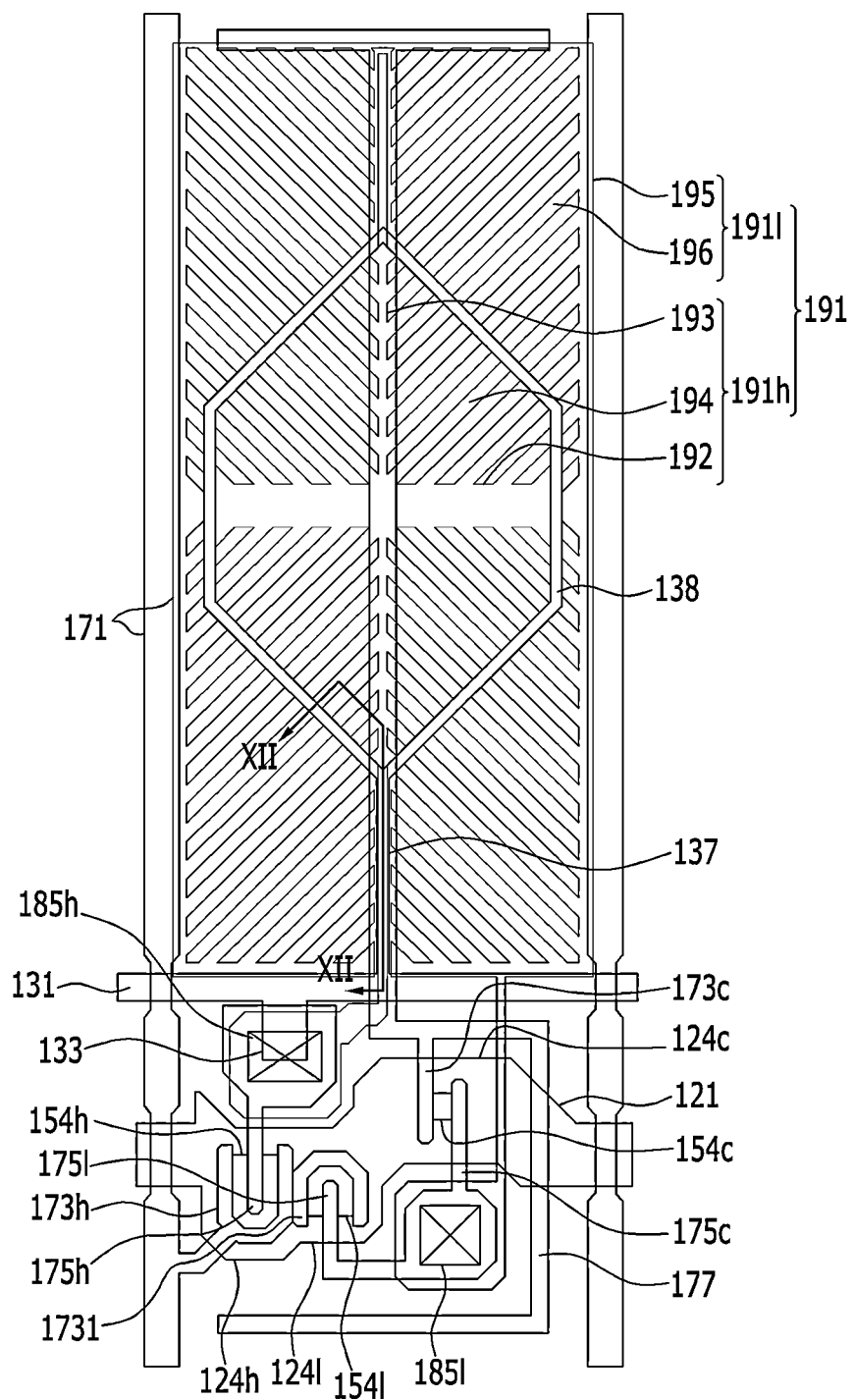
FIG. 11 is a top plan view of an exemplary embodiment of an LCD according to the invention.
Figure 12:
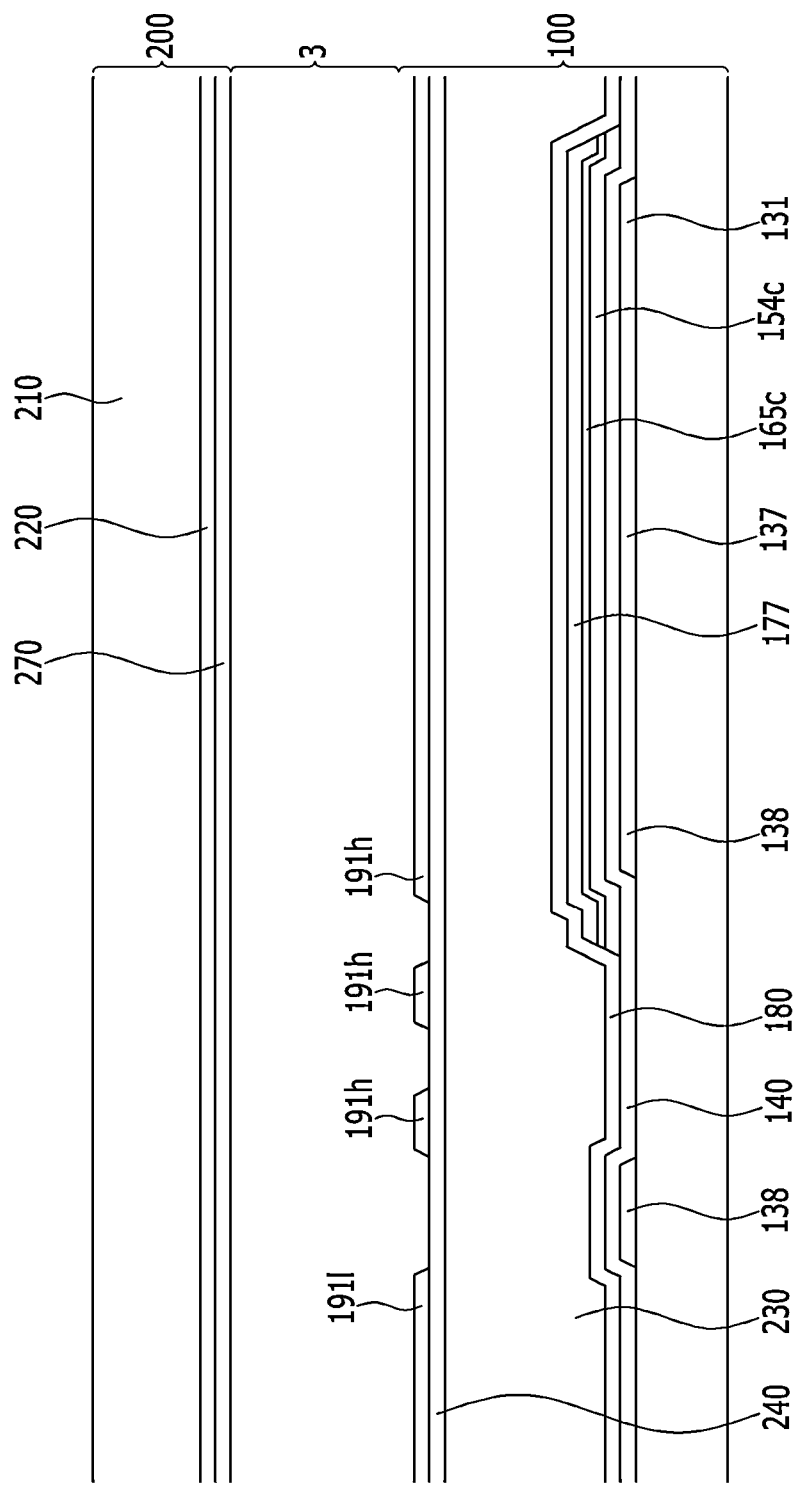
FIG. 12 is a cross-sectional view of an exemplary embodiment of the LCD according to the invention taken along line XII-XII of FIG. 11.
Figure 13:
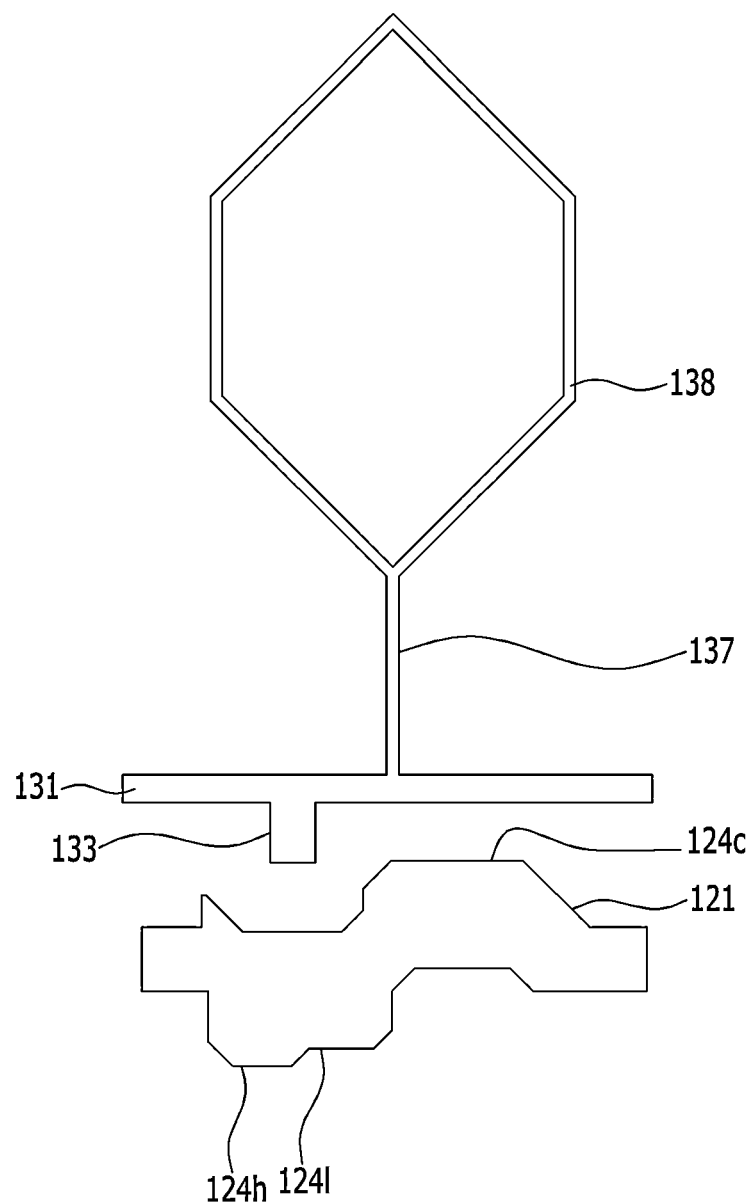
FIG. 13 is a top plan view of an exemplary embodiment of a portion of a layer of an LCD according to the invention.

The LCD according to an exemplary embodiment of the invention shown in FIGS. 11 to 13 is substantially the same with the LCD according to an exemplary embodiment of the invention shown in FIGS. 1 to 10 such that the overlapping description thereof is omitted. The exemplary embodiment is the same as the previous exemplary embodiment except for the compensation electrode connected to the first reference voltage line which will be described in detail.

FIG. 11 is a top plan view of an LCD according to an exemplary embodiment of the invention, FIG. 12 is a cross-sectional view of the LCD according to an exemplary embodiment of the invention taken along line XII-XII of FIG. 11, and FIG. 13 is a top plan view of a portion of a layer of an LCD according to an exemplary embodiment of the invention.

In the exemplary embodiment shown in FIGS. 1 to 6, the compensation electrode is electrically floated, but in the exemplary embodiment shown in FIGS. 11 to 13, the compensation electrode 138 is connected to the first reference voltage line 131.

In an exemplary embodiment, the compensation electrode 138 is provided in the same layer as the gate line 121 and the first reference voltage line 131, and FIG. 13 shows the gate line 121, the first reference voltage line 131, and the compensation electrode 138 provided in the same layer.

A connection electrode 137 connecting the compensation electrode 138 and the first reference voltage line 131 is further provided. The connection electrode 137 may be provided in the same layer as the compensation electrode 138 and the first reference voltage line 131. The connection electrode 137 may overlap the second reference voltage line 177.

The compensation electrode 138 is connected to the first reference voltage line 131, thereby receiving the predetermined voltage from the first reference voltage line 131 through the connection electrode 137.

Next, the LCD according to an exemplary embodiment of the invention will be described with reference to FIGS. 14 to 17.

The LCD according to an exemplary embodiment of the invention shown in FIGS. 14 to 17 is substantially the same as the LCD according to an exemplary embodiment of the invention shown in FIGS. 1 to 10 such that the overlapping description thereof is omitted. The exemplary embodiment is the same as the previous exemplary embodiment except for the compensation electrode provided in the same layer as the data line, which will be described in detail.

Figure 14:
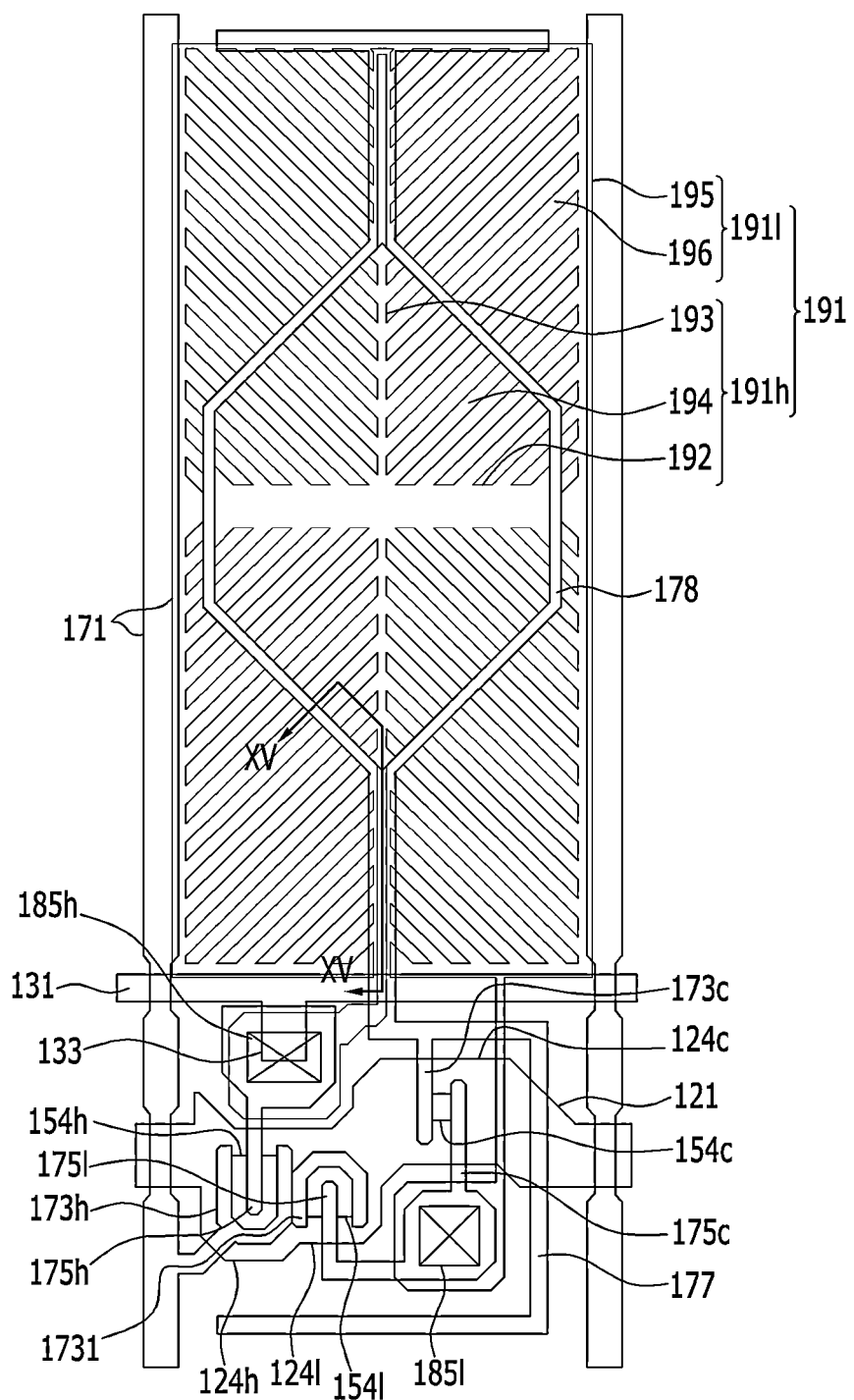
FIG. 14 is a top plan view of an exemplary embodiment of an LCD according to the invention.
Figure 15:
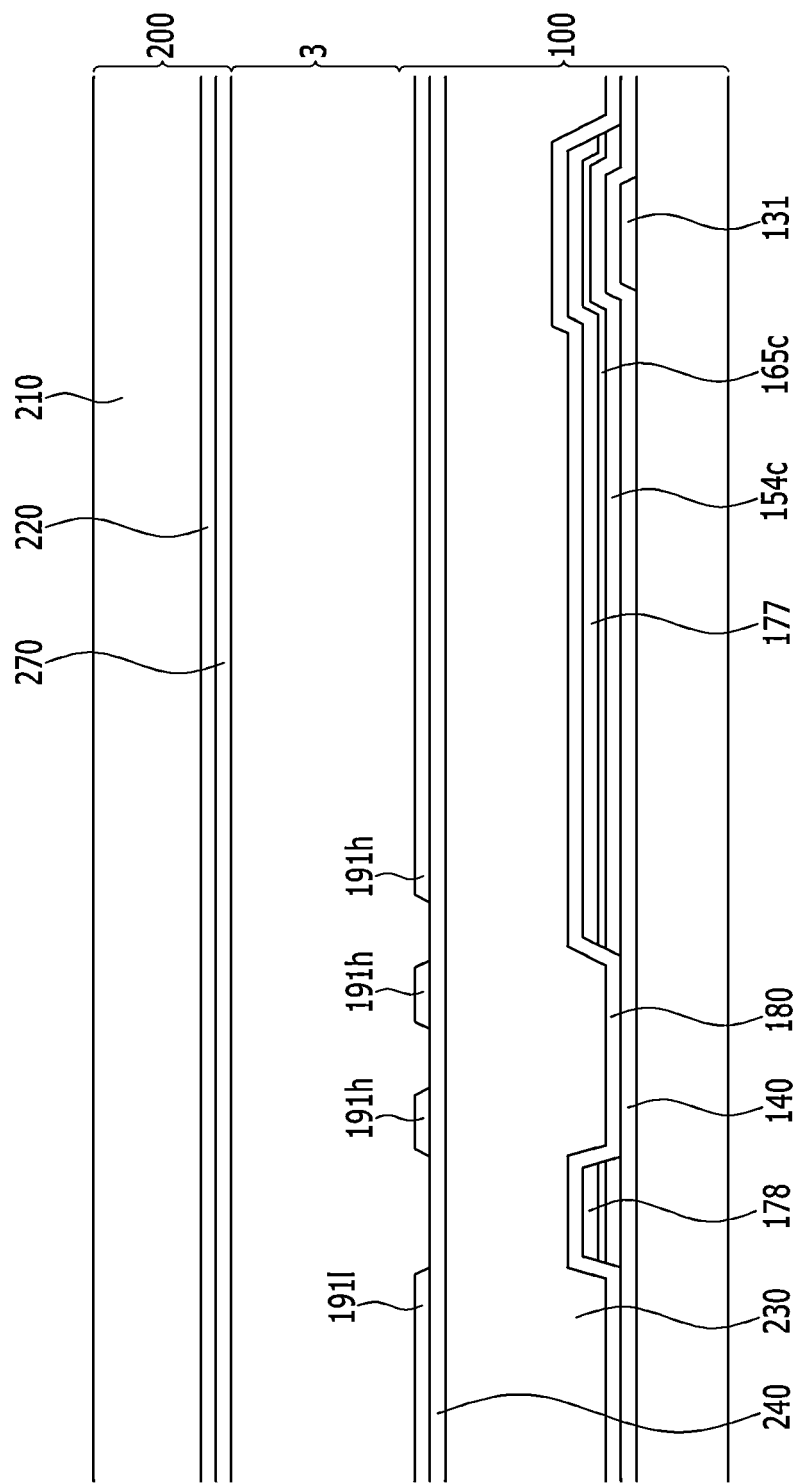
FIG. 15 is a cross-sectional view of an exemplary embodiment of the LCD according to the invention taken along line XV-XV of FIG. 14.
Figure 16:
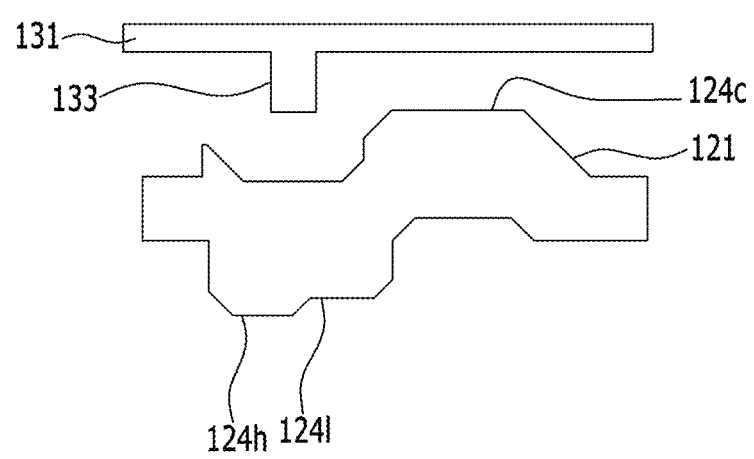
FIGS. 16 and 17 are top plan views of a portion of a layer of an LCD according to an exemplary embodiment of the invention.
Figure 17:
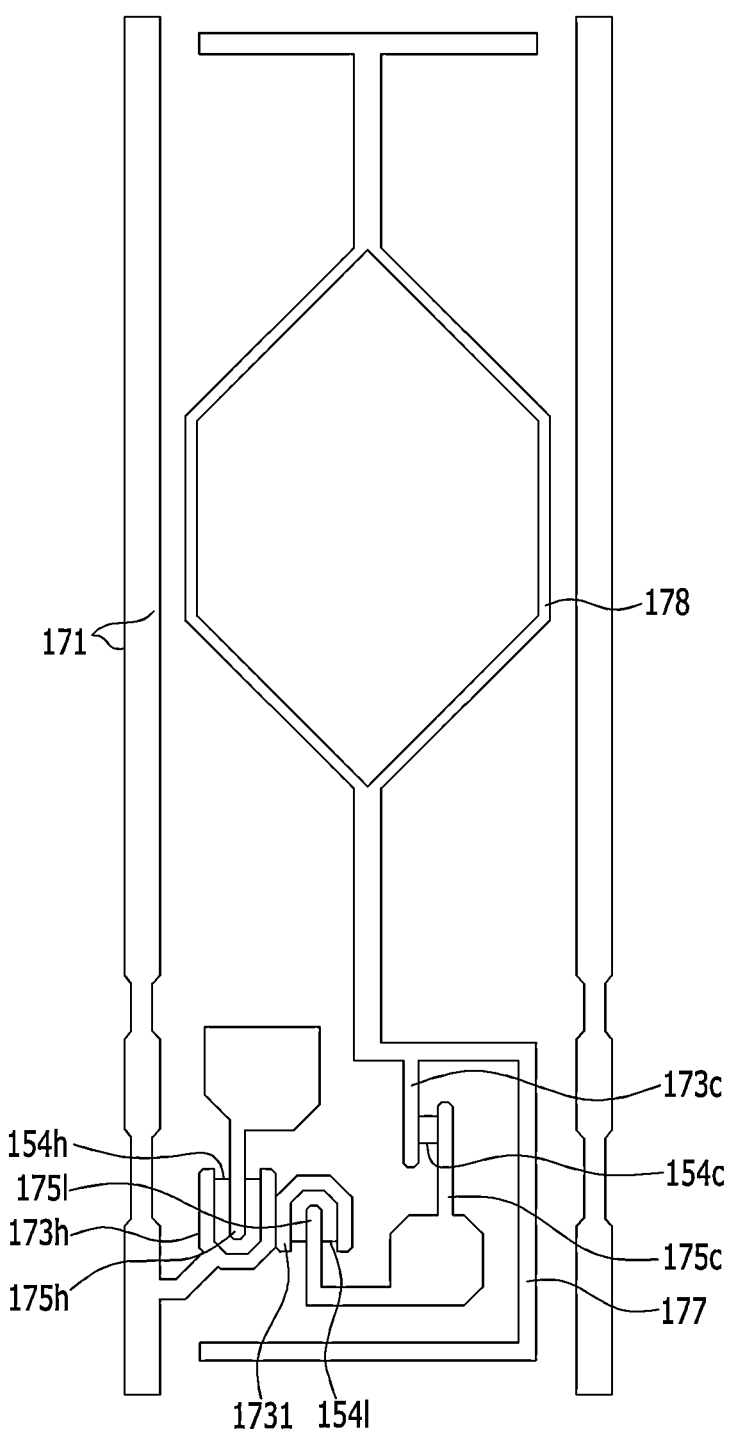

FIG. 14 is a top plan view of an LCD according to an exemplary embodiment of the invention, FIG. 15 is a cross-sectional view of the LCD according to an exemplary embodiment of the invention taken along line XV-XV of FIG. 14, and FIGS. 16 and 17 are top plan views of a portion of a layer of an LCD according to an exemplary embodiment of the invention.

In the previous exemplary embodiment, the compensation electrode is provided in the same layer as the gate line, but in the exemplary embodiment, a compensation electrode 178 is provided in the same layer as the data line 171.

FIG. 16 shows the gate line 121 and the first reference voltage line 131 provided in the same layer.

The compensation electrode 178 is provided in the same layer as the data line 171, and FIG. 17 shows the data line 171, the second reference voltage line 177, the first source electrode 173*h*, the first drain electrode 175*h*, the second source electrode 173*l*, the second drain electrode 175*l*, the third source electrode 173*c*, and the third drain electrode 175*c* provided in the same layer.

The compensation electrode 178 is connected to the second reference voltage line 177. In an exemplary embodiment, the second reference voltage line 177 is provided in the longitudinal direction and the compensation electrode 178 is provided with the hexagon shape, for example. At this time, two vertices of the hexagon shape facing may meet the second reference voltage line 177.

The compensation electrode 178 is connected to the second reference voltage line 177, thereby receiving the predetermined voltage through the second reference voltage line 177.

The connection position of the compensation electrode 178 and the second reference voltage line 177 may be variously changed. Also, in another exemplary embodiment, the compensation electrode 178 and the second reference voltage line 177 may not be connected. That is, the compensation electrode 178 may be electrically floated.

Next, the LCD according to an exemplary embodiment of the invention will be described with reference to FIGS. 18 to 21.

The LCD according to an exemplary embodiment of the invention shown in FIGS. 18 to 21 is the same the LCD according to an exemplary embodiment of the invention shown in FIGS. 1 to 10 such that the overlapping description thereof is omitted. The exemplary embodiment is the same as the previous exemplary embodiment except for the compensation electrode including a first compensation electrode and a second compensation electrode, which will be described in detail.

Figure 18:
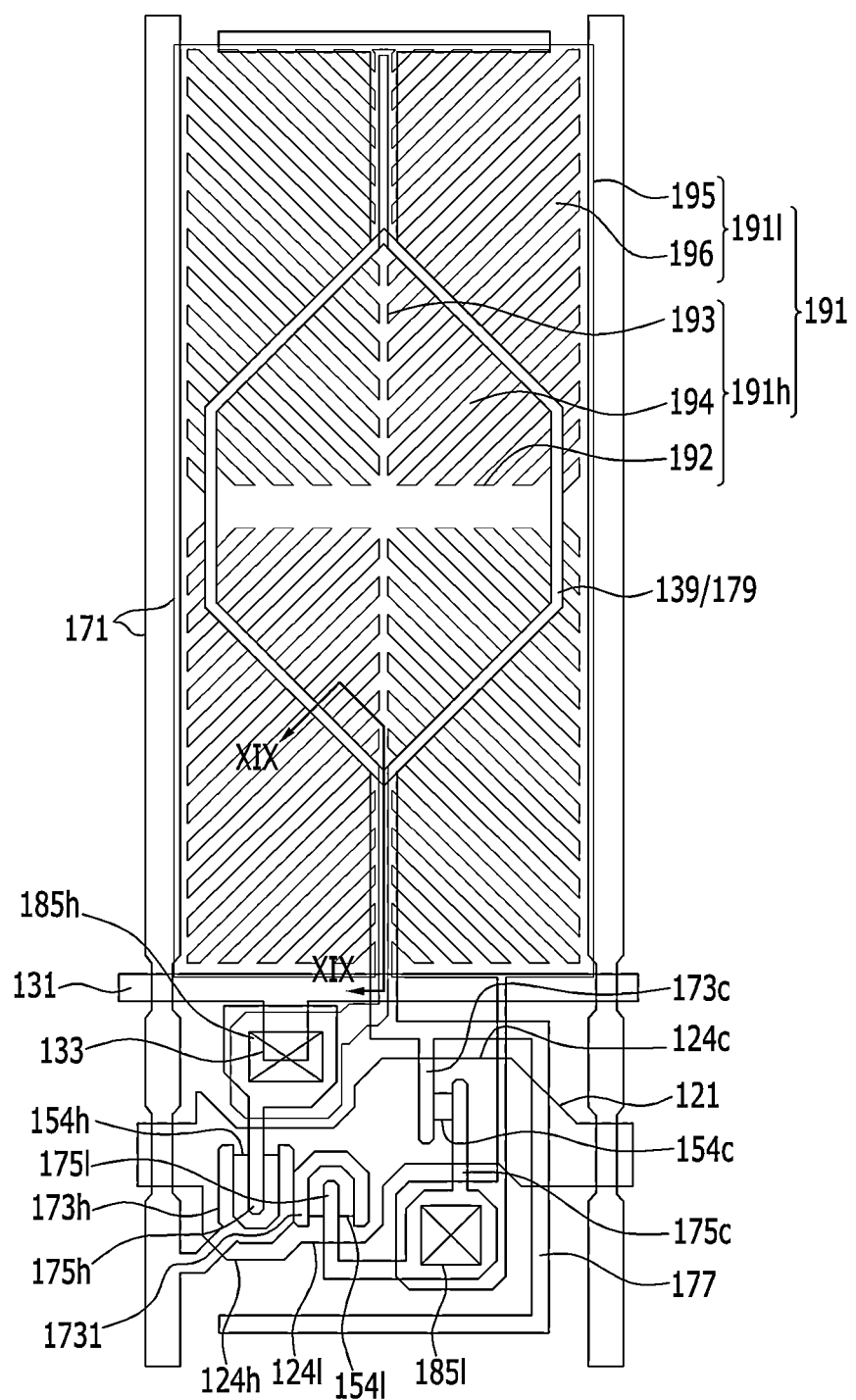
FIG. 18 is a top plan view of an exemplary embodiment of an LCD according to the invention.
Figure 19:
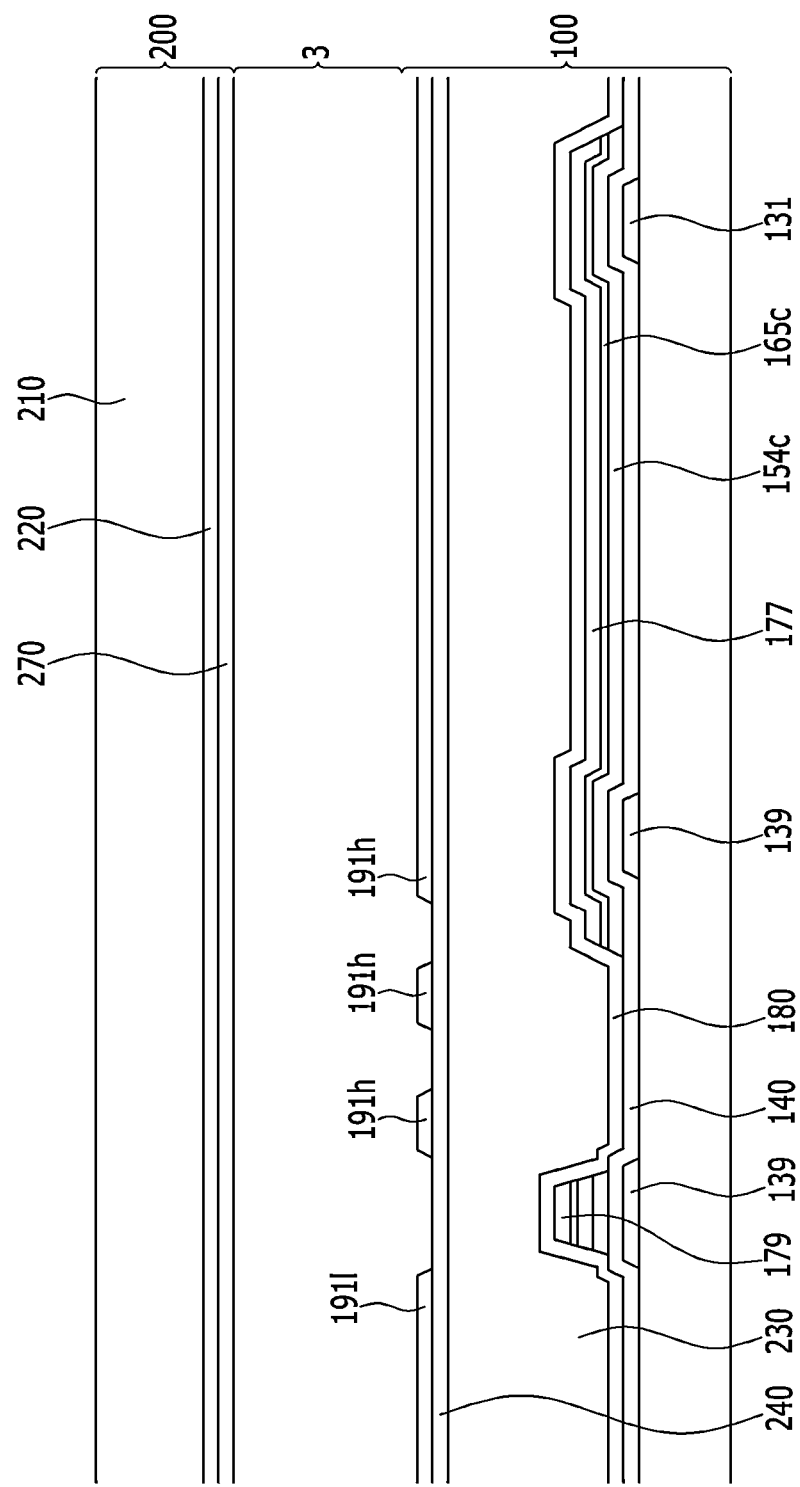
FIG. 19 is a cross-sectional view of an exemplary embodiment of the LCD according to the invention taken along line XIX-XIX of FIG. 18.
Figure 20:
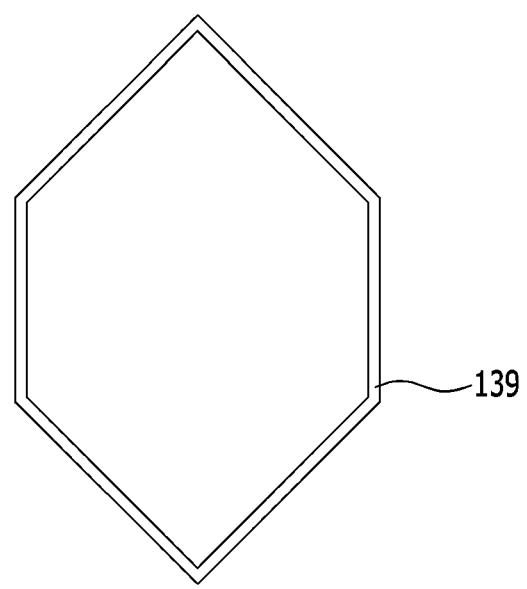
FIGS. 20 and 21 are top plan views of a portion of an exemplary embodiment of a layer of an LCD according to the invention.
Figure 20:
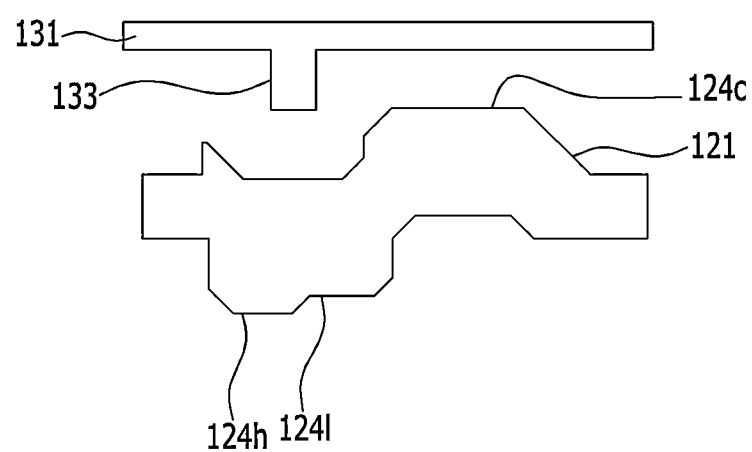
Figure 21:
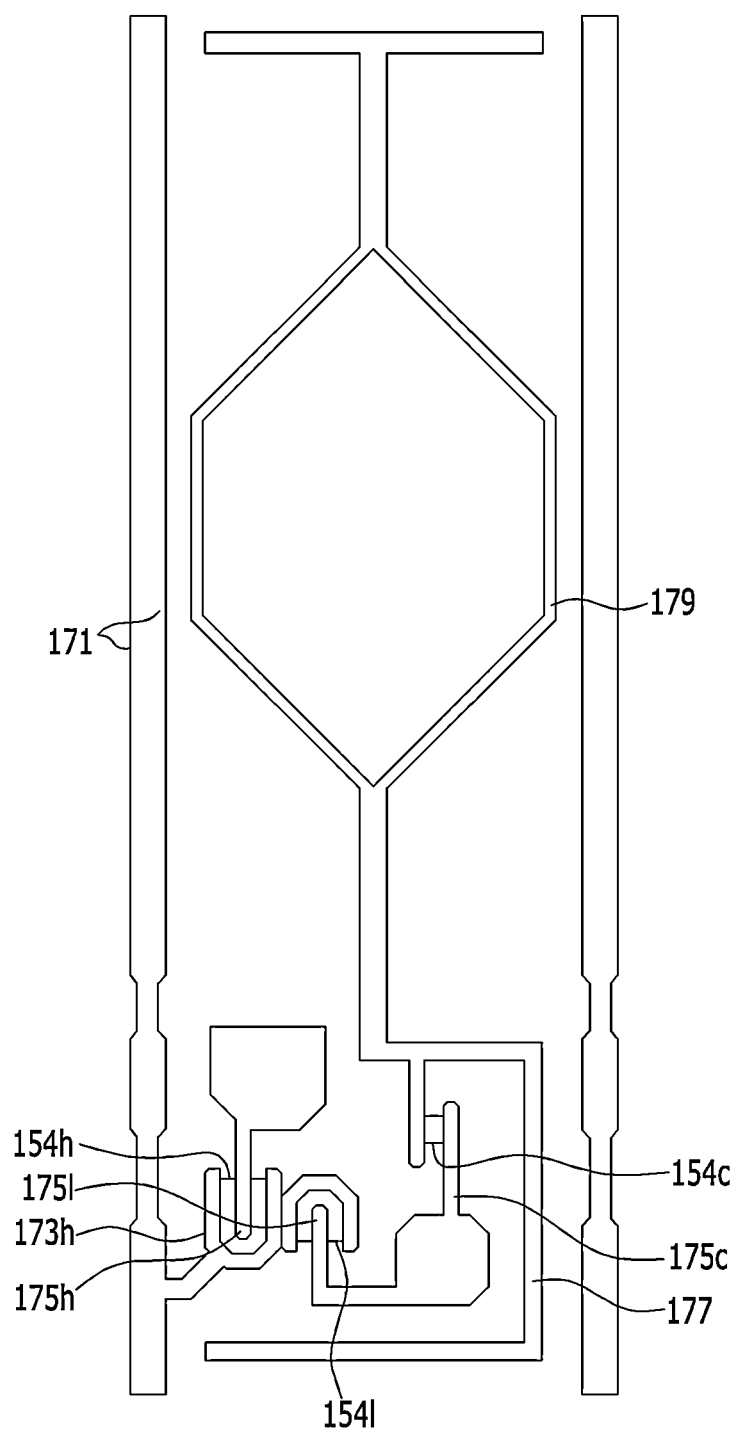

FIG. 18 is a top plan view of an LCD according to an exemplary embodiment of the invention, FIG. 19 is a cross-sectional view of the LCD according to an exemplary embodiment of the invention taken along line XIX-XIX of FIG. 18, and FIGS. 20 and 21 are top plan views of a portion of a layer of an LCD according to an exemplary embodiment of the invention.

In the exemplary embodiment, the compensation electrode (139 and 179) includes a first compensation electrode 139 and a second compensation electrode 179. The first compensation electrode 139 and the second compensation electrode 179 are provided in different layers and overlap each other.

The first compensation electrode 139 is provided in the same layer as the gate line 121. FIG. 20 shows the gate line 121, the first reference voltage line 131, and the first compensation electrode 139 provided in the same layer. In an exemplary embodiment, the first compensation electrode 139 is electrically floated.

The second compensation electrode 179 is provided in the same layer as the data line 171. FIG. 21 shows the data line 171, the second reference voltage line 177, and the second compensation electrode 179 provided in the same layer. The second compensation electrode 179 is connected to the second reference voltage line 177. Accordingly, the second compensation electrode 179 receives the predetermined voltage through the second reference voltage line 177.

In an exemplary embodiment, the first compensation electrode 139 is electrically floated and the second compensation electrode 179 is connected to the second reference voltage line 177, but the invention is not limited thereto. The first compensation electrode 139 may also be connected to the first reference voltage line 131 thereby being applied with the predetermined voltage. Further, the second compensation electrode 179 may also be separated from the second reference voltage line 177, thereby being electrically floated.

Next, the LCD according to an exemplary embodiment of the invention will be described with reference to FIG. 22.

Figure 22:
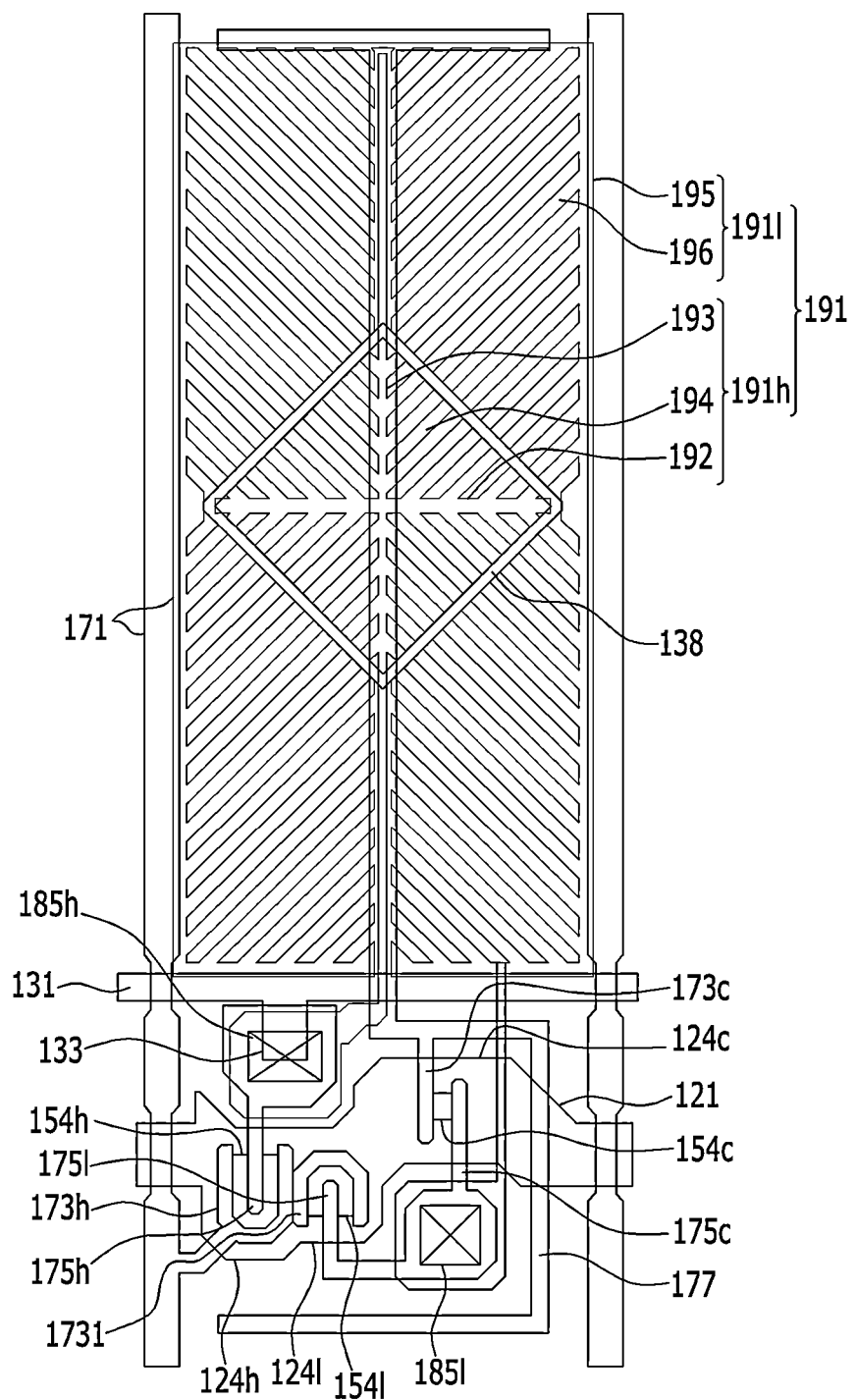
FIG. 22 is a top plan view of an exemplary embodiment of an LCD according to the invention.

The LCD according to an exemplary embodiment of the invention shown in FIG. 22 is substantially the same with the LCD according to an exemplary embodiment of the invention shown in FIGS. 1 to 10 such that the overlapping description thereof is omitted. The compensation electrode of the illustrated exemplary embodiment includes a rhombus shape differently from the previous exemplary embodiment, which will be further described.

FIG. 22 is a top plan view of an LCD according to an exemplary embodiment of the invention.

In the previous exemplary embodiment, the entire shape of the first subpixel electrode includes the hexagon shape, but in the illustrated exemplary embodiment, the entire shape of the first subpixel electrode 191h includes the rhombus shape.

The second subpixel electrode 191l has the shape enclosing the first subpixel electrode 191h such that the entire plane shape of the second subpixel electrode 191l includes the quadrangle in which the rhombus opening is defined, for example.

The compensation electrode 138 is provided between the first subpixel electrode 191h and the second subpixel electrode 191l such that the compensation electrode 138 includes a rhombus in which an opening is defined, for example. That is, the compensation electrode 138 is provided linearly along the edge of the rhombus.

In exemplary embodiments, The shape of the compensation electrode 138 may include various polygons as well as the rhombus. The shape of the compensation electrode 138 may be various along with the shape of the first subpixel electrode 191h and the second subpixel electrode 191l.

Next, the LCD according to an exemplary embodiment of the invention will be described with reference to FIGS. 23 to 25.

Figure 23:
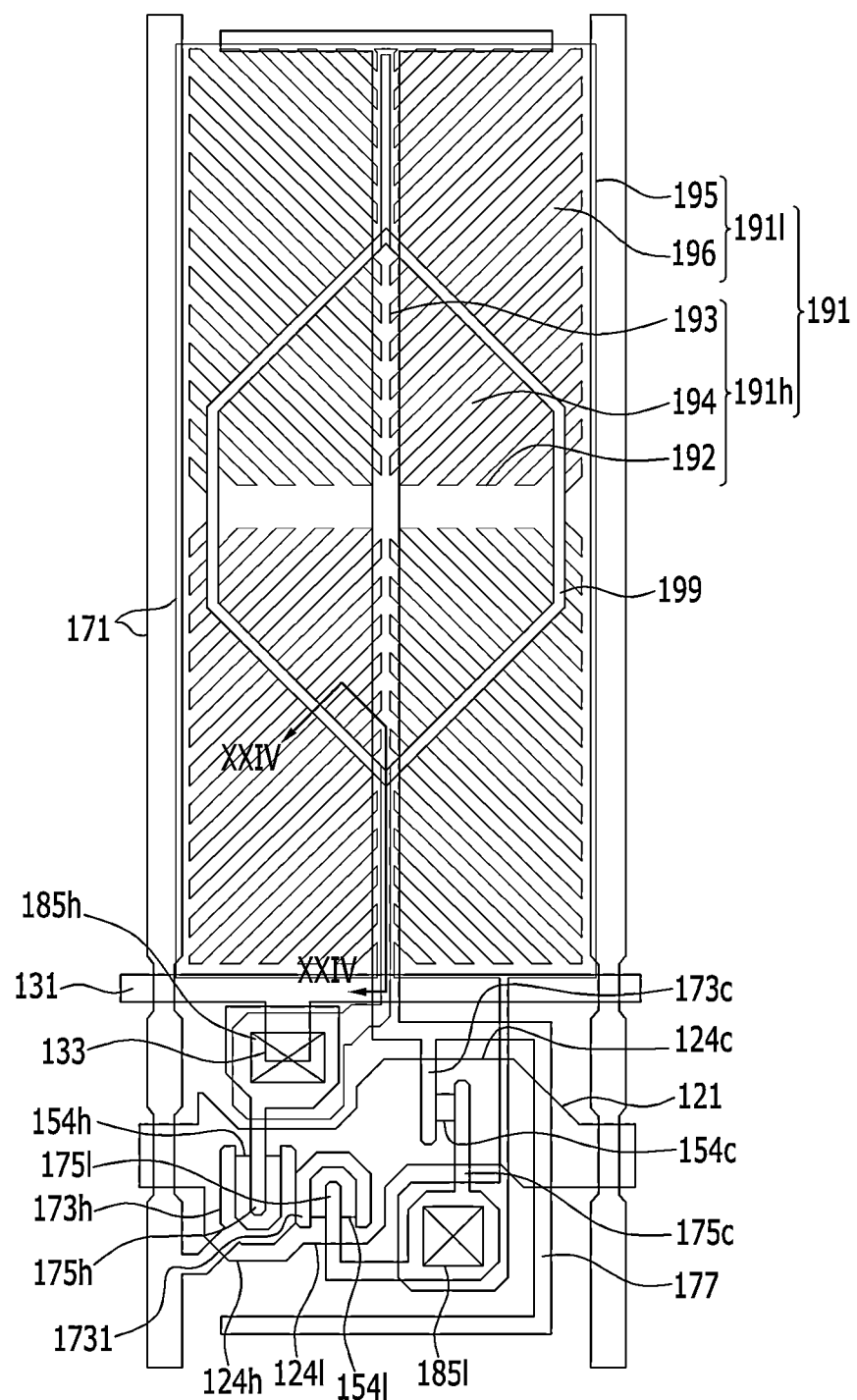
FIG. 23 is a top plan view of an exemplary embodiment of an LCD according to the invention.
Figure 24:
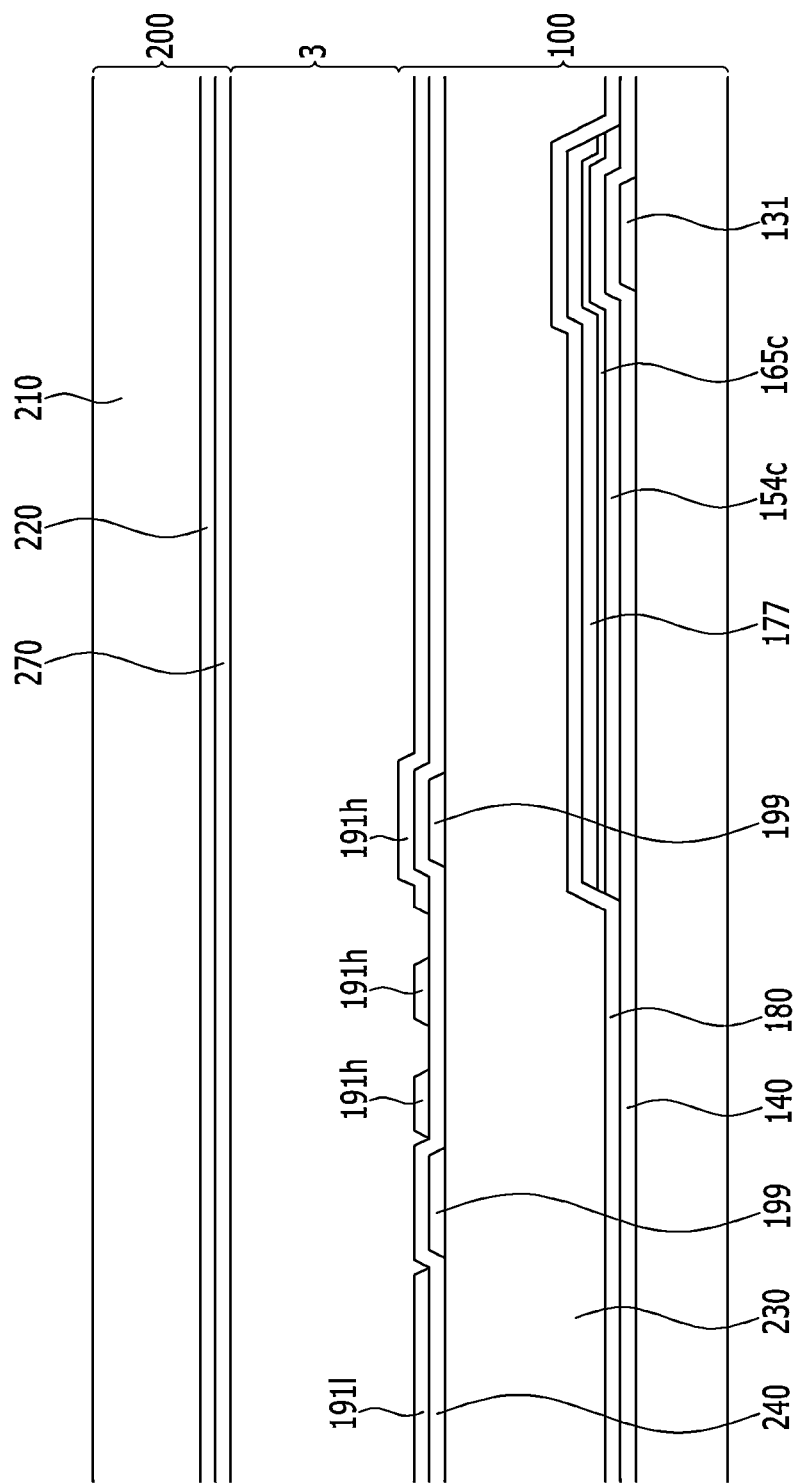
FIG. 24 is a cross-sectional view of an exemplary embodiment of the LCD according to the invention taken along line XXIV-XXIV of FIG. 23.
Figure 25:
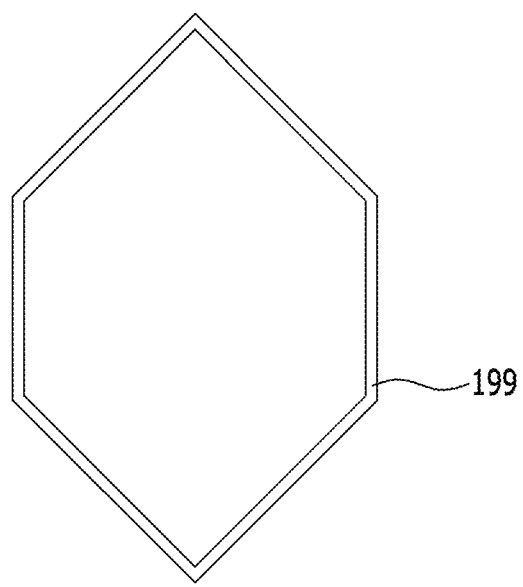
FIG. 25 is a top plan view of an exemplary embodiment of a portion of a layer of an LCD according to the invention.

The LCD according to an exemplary embodiment of the invention shown in FIGS. 23 to 25 is the substantially the same with the LCD according to an exemplary embodiment of the invention shown in FIGS. 1 to 10 such that the overlapping description thereof is omitted. The compensation electrode of the exemplary embodiment includes the transparent conductive material differently from the previous exemplary embodiment, which will be described in detail.

FIG. 23 is a top plan view of an LCD according to an exemplary embodiment of the invention, FIG. 24 is a cross-sectional view of the LCD according to an exemplary embodiment of the invention taken along line XXIV-XXIV of FIG. 23, and FIG. 25 is a top plan view of a portion of a layer of an LCD according to an exemplary embodiment of the invention.

In the exemplary embodiment, the compensation electrode is provided in the same layer as the gate line, but in the exemplary embodiment, the compensation electrode is not provided in the same layer as the gate line. Also, the compensation electrode is also not provided in the same layer as the data line. In the exemplary embodiment, the compensation electrode 199 includes the different layer from the gate line 121 and the data line 171. FIG. 25 only shows the compensation electrode 199.

The insulating layer such as the passivation layer 180 and the color filter 230 is disposed on the gate line 121 and the data line 171. The compensation electrode 199 is disposed on the color filter 230.

The capping layer 240 is disposed on the compensation electrode 199, and the pixel electrode 191 including the first subpixel electrode 191h and the second subpixel electrode 191l is disposed on the capping layer 240.

In an exemplary embodiment, the compensation electrode 199 may include the conductive material such as ITO and IZO.

In a process of aligning the mask to provide the metal pattern, a misalignment may be generated such that the compensation electrode 199 may be biased to one side of the first subpixel electrode 191h and the second subpixel electrode 191l. In the exemplary embodiment, the compensation electrode 199 includes the transparent material such that the loss of the aperture ratio is not generated even when the misalignment of the mask is generated.

Next, a simulation result when a predetermined voltage is applied to an LCD according to an exemplary embodiment of the invention will be described with reference to FIG. 26.

Figure 26:
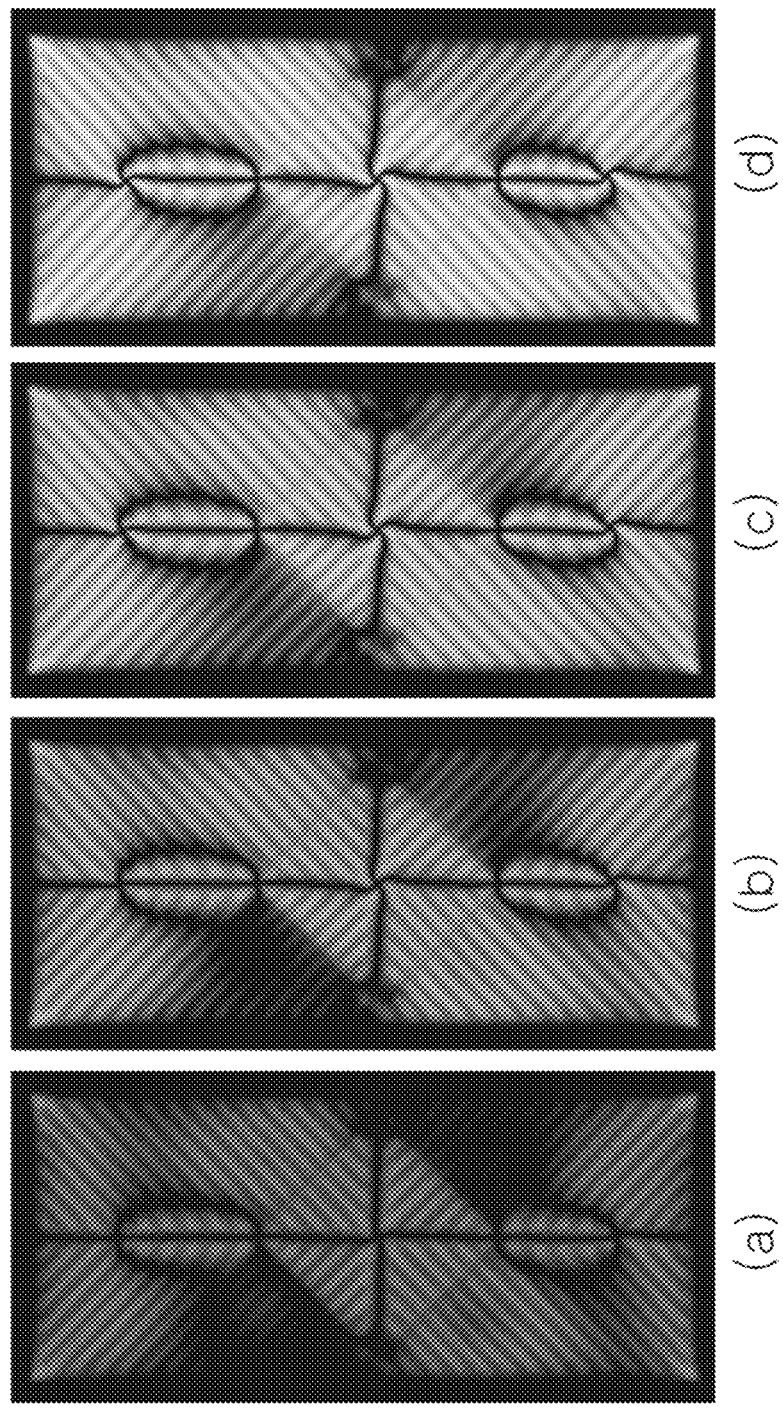
FIG. 26 is a simulation result of applying a predetermined voltage to an exemplary embodiment of an LCD according to the invention.

FIG. 26 is a simulation result when a predetermined voltage is applied to an LCD according to an exemplary embodiment of the invention. In FIGS. 26 (a) to 26 (d), the magnitudes of the voltages applied to the liquid crystal layer are respectively different. FIG. 26 (a) is the case that the voltage applied to the liquid crystal layer is 3.4 volts (V). FIGS. 26 (b), 26 (c), and 26 (d) are the cases that the voltages applied to the liquid crystal layer are respectively 3.6 V, 3.8 V, and 4.0 V. As the voltage is increased, a gray close to white appears, and as the voltage is decreased, a gray close to black appears.

Regardless of the voltage applied to the liquid crystal layer, it is confirmed that the texture is not generated in the boundary of the first subpixel electrode and the second subpixel electrode. In an exemplary embodiment of the invention, the compensation electrode is provided downward between the first subpixel electrode and the second subpixel electrode, thereby preventing the generation of the texture.

Next, transmittance of an LCD according to an exemplary embodiment of the invention will be described with reference to FIG. 27.

Figure 27:
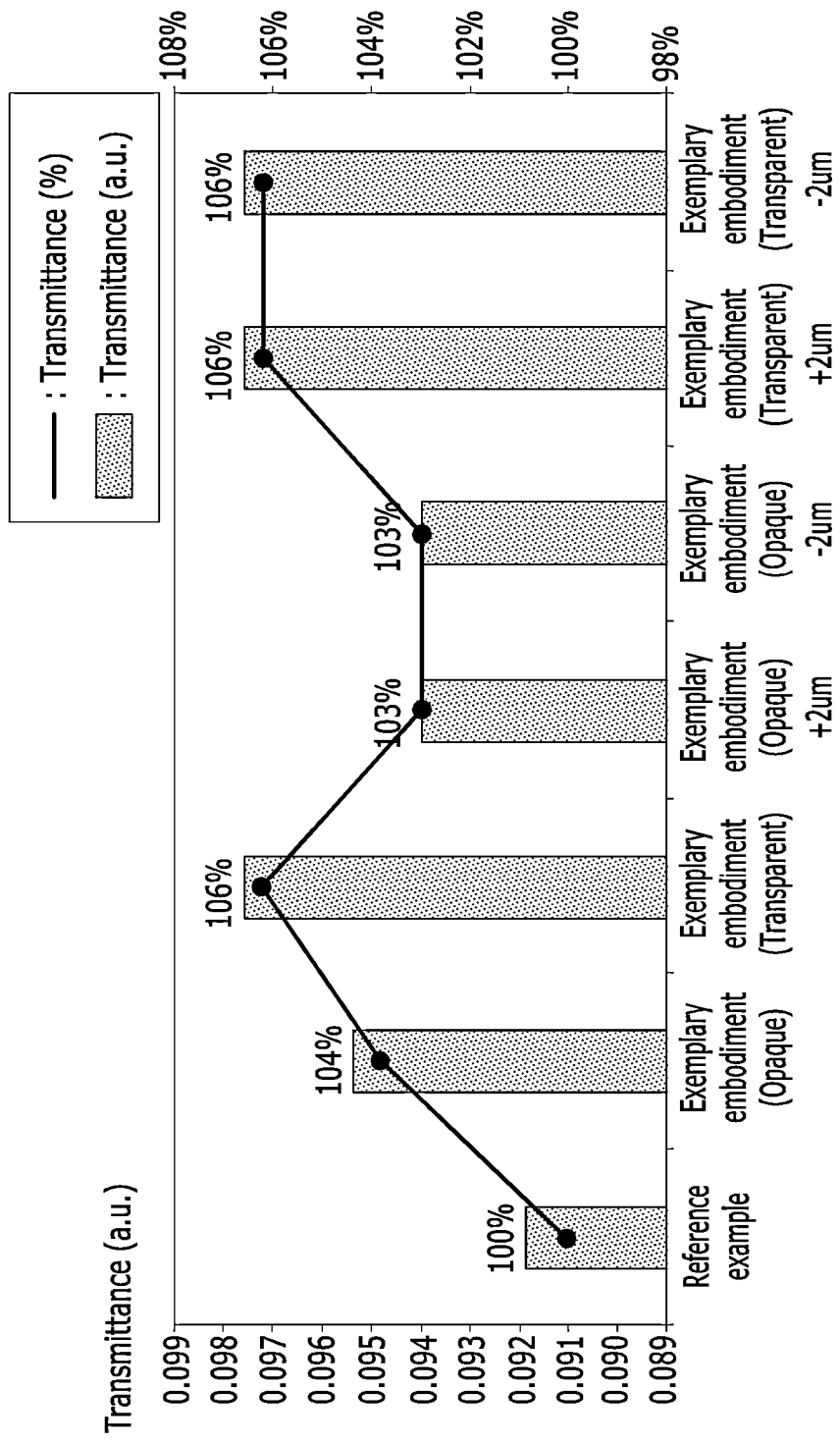
FIG. 27 is a graph showing transmittance measured in measured in absorbance units (a.u.) of exemplary embodiments of an LCD along with a reference example according to the invention.

FIG. 27 is a graph showing transmittance of an LCD along with a reference example according to several exemplary embodiments of the invention.

The horizontal axis represents a plurality of exemplary embodiments. A leftmost case is one in which the compensation electrode is not provided as a reference, a second case is an exemplary embodiment of the invention in which the compensation electrode is an opaque conductive material, and a third case is an exemplary embodiment of the invention in which the compensation electrode includes the transparent conductive material. A fourth case and a fifth case are those in which the compensation electrode is the opaque conductive material and the misalignment of the mask is respectively generated by about 2 μm in the right side (i.e., +2 μm) and the left side (i.e., −2 μm). A sixth case and a seventh case are those in which the compensation electrode is the transparent conductive material and the misalignment of the mask is respectively generated by about 2 μm in the right side (i.e., +2 μm) and the left side (i.e., −2 μm).

A vertical axis represents the transmittance. A left value of the vertical axis is a value measured in absorbance units (a.u.) in the simulation, and a right value of the vertical axis is a value that is converted into a percentage. The converted value is a value with respect to the reference example as 100%.

In an exemplary embodiment of the invention in which the compensation pattern is provided, it may be confirmed that the transmittance is increased compared with the reference example in which the compensation pattern is not provided. In an exemplary embodiment of the invention, the transmittance may be increased by preventing the generation of the texture.

When the compensation electrode includes the opaque conductive material, the transmittance is increased by about 4%, and when the compensation electrode includes the transparent conductive material, the transmittance is increased by about 6%. When the compensation electrode includes the opaque conductive material, the light is not transmitted at the portion where the compensation electrode is provided, and when the compensation electrode includes the transparent conductive material, the light is transmitted at the portion where the compensation electrode is provided such that the transmittance is further improved.

When the compensation electrode includes the opaque conductive material, when the misalignment of the mask is generated, a loss of about 1% of the transmittance is generated. Nevertheless, compared with the reference example in which the compensation electrode is not provided, it may be confirmed that the transmittance is improved by about 3%.

When the compensation electrode includes the transparent conductive material, although the misalignment of the mask is generated, the loss of the transmittance is not generated. That is, regardless of the misalignment of the mask, it may be confirmed that the transmittance is improved by about 6%.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A liquid crystal display comprising:
   a first substrate and a second substrate facing each other;
   a pixel electrode disposed on the first substrate and including:
   a first subpixel electrode including a plurality of first branch electrodes and
   a second subpixel electrode which is separated from the first subpixel electrode, includes a plurality of second branch electrodes, and encloses the first subpixel electrode;
   a compensation electrode positioned between the first subpixel electrode and the second subpixel electrode;
   a common electrode disposed on the second substrate; and
   a liquid crystal layer positioned between the first substrate and the second substrate,
   wherein the compensation electrode is floated.

2. The liquid crystal display of claim 1, further comprising:
   an insulating layer disposed between the compensation electrode and the pixel electrode.

3. The liquid crystal display of claim 2, wherein:
   the pixel electrode is disposed on the insulating layer, and the compensation electrode is disposed under the insulating layer.

4. The liquid crystal display of claim 1, wherein:
   the pixel electrode is provided as a quadrangle shape in a plan view;
   the first subpixel electrode is provided as a polygon shape in the plan view; and
   the second subpixel electrode is provided as the quadrangle shape, in the plan view, in which an opening of the polygon shape is defined.

5. The liquid crystal display of claim 4, wherein:
   the first subpixel electrode is provided as a rhombus shape or a hexagon shape.

6. The liquid crystal display of claim 5, wherein
   the compensation electrode is provided as the rhombus shape or the hexagon shape in which an opening is defined.

7. The liquid crystal display of claim 1, further comprising:
   a gate line and a data line provided in different layers, respectively, on the first substrate; and
   a first thin film transistor connected to the gate line, the data line, and the first subpixel electrode.

8. The liquid crystal display of claim 7, wherein:
   the compensation electrode is provided in the same layer as the gate line.

9. The liquid crystal display of claim 7, wherein:
   the compensation electrode is provided in the same layer as the data line.

10. The liquid crystal display of claim 7, wherein:
    the compensation electrode includes a first compensation sub-electrode and a second compensation sub-electrode;
    the first compensation sub-electrode is provided in the same layer as the gate line; and
    the second compensation sub-electrode is provided in the same layer as the data line.

11. The liquid crystal display of claim 10, further comprising:
    a reference voltage line provided in the same layer as the data line,
    wherein the reference voltage line and the second compensation electrode are connected, and
    the first compensation sub-electrode is floated.

12. The liquid crystal display of claim 7, wherein:
the compensation electrode includes a transparent conductive material.

13. The liquid crystal display of claim 12, further comprising:
a color filter disposed on the gate line and the data line; and
an insulating layer disposed between the compensation electrode and the pixel electrode,
wherein the compensation electrode is positioned on the color filter.

14. The liquid crystal display of claim 1, further comprising:
a gate line and a data line disposed on the first substrate;
a reference voltage line disposed on the first substrate and applied with a predetermined voltage;
a first thin film transistor and a second thin film transistor connected to the gate line and the data line; and
a third thin film transistor connected to the gate line, the second thin film transistor, and the reference voltage line,
wherein
the first subpixel electrode is connected to the first thin film transistor, and
the second subpixel electrode is connected to the second thin film transistor.

15. The liquid crystal display of claim 1, further comprising:
a gate line, a step-down gate line, and a data line disposed on the first substrate;
a reference voltage line disposed on the first substrate and applied with a predetermined voltage;
a first thin film transistor and a second thin film transistor connected to the gate line and the data line; and
a third thin film transistor connected to the step-down gate line, the second thin film transistor, and the reference voltage line,
wherein
the first subpixel electrode is connected to the first thin film transistor, and
the second subpixel electrode is connected to the second thin film transistor.

16. The liquid crystal display of claim 1, further comprising:
a gate line, a first data line, and a second data line disposed on the first substrate;
a first thin film transistor connected to the gate line and the first data line; and
a second thin film transistor connected to the gate line and the second data line,
wherein
the first subpixel electrode is connected to the first thin film transistor, and
the second subpixel electrode is connected to the second thin film transistor.

17. The liquid crystal display of claim 1, wherein:
a first voltage applied to the first subpixel electrode is higher than a second voltage applied to the second subpixel electrode.

* * * * *